US008392192B2

(12) United States Patent
Cho et al.

(10) Patent No.: US 8,392,192 B2
(45) Date of Patent: Mar. 5, 2013

(54) METHOD AND APPARATUS FOR IMPROVING TRANSACTION SUCCESS RATES FOR VOICE REMINDER APPLICATIONS IN E-COMMERCE

(76) Inventors: Samuel Seungmin Cho, Fremont, CA (US); Oon-Gil Paik, Irvine, CA (US)

( * ) Notice: Subject to any disclaimer, the term of this patent is extended or adjusted under 35 U.S.C. 154(b) by 424 days.

(21) Appl. No.: 12/563,110

(22) Filed: Sep. 18, 2009

(65) Prior Publication Data

US 2010/0070282 A1   Mar. 18, 2010

Related U.S. Application Data

(63) Continuation-in-part of application No. 11/856,726, filed on Sep. 18, 2007, now Pat. No. 7,873,520.

(60) Provisional application No. 61/098,124, filed on Sep. 18, 2008.

(51) Int. Cl.
*G10L 13/08* (2006.01)

(52) U.S. Cl. ..................................................... 704/260

(58) Field of Classification Search .................... 704/260
See application file for complete search history.

(56) References Cited

U.S. PATENT DOCUMENTS

| | | | | |
|---|---|---|---|---|
| 6,182,041 | B1 * | 1/2001 | Li et al. ......................... | 704/260 |
| 7,411,939 | B1 * | 8/2008 | Lamb et al. ................... | 370/352 |
| 7,497,373 | B2 * | 3/2009 | Mandalia et al. ............. | 235/379 |
| 7,949,572 | B2 * | 5/2011 | Perrochon et al. ......... | 705/26.41 |
| 2002/0111873 | A1 * | 8/2002 | Ehrlich et al. ................. | 705/26 |
| 2004/0066924 | A1 * | 4/2004 | Wertsberger ............. | 379/201.01 |
| 2004/0119600 | A1 * | 6/2004 | Hampton ................... | 340/691.1 |
| 2004/0236679 | A1 * | 11/2004 | Anderson ..................... | 705/39 |
| 2005/0021417 | A1 * | 1/2005 | Kassan ......................... | 705/26 |
| 2005/0159669 | A1 * | 7/2005 | Abraham-Fuchs ........... | 600/544 |
| 2005/0278231 | A1 * | 12/2005 | Teeter ............................ | 705/26 |
| 2006/0036478 | A1 * | 2/2006 | Aleynikov et al. ............. | 705/8 |
| 2006/0061488 | A1 * | 3/2006 | Dunton ........................ | 340/988 |
| 2007/0050191 | A1 * | 3/2007 | Weider et al. ................. | 704/275 |
| 2007/0066354 | A1 * | 3/2007 | Silverbrook et al. ......... | 455/557 |
| 2007/0150370 | A1 * | 6/2007 | Staib et al. .................... | 705/26 |
| 2007/0271149 | A1 * | 11/2007 | Siegel et al. ................... | 705/26 |
| 2008/0288342 | A1 * | 11/2008 | Ingleshwar .................. | 705/14 |
| 2010/0057443 | A1 * | 3/2010 | Di Cristo et al. ............... | 704/9 |
| 2011/0246325 | A1 * | 10/2011 | Altschuler ................ | 705/26.61 |
| 2012/0089530 | A1 * | 4/2012 | Klingenberg et al. ........ | 705/330 |

* cited by examiner

*Primary Examiner* — Jakieda Jackson
(74) *Attorney, Agent, or Firm* — Invent Capture, LLC.; Samuel S. Cho

(57) ABSTRACT

Methods and apparatuses are disclosed for improving transaction success rates for voice reminder applications in e-commerce. In one embodiment of the invention, the voice reminder applications in e-commerce utilizes a network-based text-to-speech (TTS) alert system, which can generate a purchase reminder associated with a recipient's potential purchase. The network-based text-to-speech (TTS) alert system can also deliver the purchase reminder to a recipient's voicemail and leave a transaction identifier number and a centralized or a recipient-specific call-back phone number to the recipient's voicemail. A recipient can utilize the transaction identifier number, the centralized or the recipient-specific call-back phone number, and optionally a recipient-specific password to make a phone call to retrieve the purchase reminder previously delivered to the recipient's voicemail by the network-based text-to-speech (TTS) alert system. Then, the recipient can authorize and/or complete a transaction related to the purchase reminder over the same phone call.

5 Claims, 19 Drawing Sheets

Figure 16

METHOD AND APPARATUS FOR IMPROVING TRANSACTION SUCCESS RATES FOR VOICE REMINDER APPLICATIONS IN E-COMMERCE

RELATED APPLICATIONS

The present invention claims priority to a U.S. provisional application 61/098,124 filed on Sep. 18, 2008. The present invention is also a continuation-in-part (CIP) filing of a pending U.S. non-provisional application Ser. No. 11/856,726 filed on Sep. 18, 2007.

BACKGROUND

This invention generally relates to a voice reminder system. More specifically, the invention relates to a computer network-based text-to-speech voice reminder system operatively connected to a telephone or cellular network for transmission of text-to-speech voice messages and other information to a telephone call recipient.

This invention generally relates to a voice reminder system. More specifically, the invention relates to a computer network-based text-to-speech voice reminder system operatively connected to a telephone or cellular network for transmission of text-to-speech voice messages and other information to a telephone call recipient.

Internet Protocol telephony, or IP telephony, has become a popular application of computer network usage in recent years. Empowered and enabled by voice-over-IP technology (i.e. VoIP), IP telephony transmits voice information as a stream of typically-digitized data packets carried at a network layer (i.e. internet protocol layer). This stream of data packets is re-assembled and converted as analog voice at a packet destination.

Conventional and existing applications of IP telephony primarily involve voice-to-voice communications in real-time. Companies such as Net2Phone and Skype provide commercially-scalable IT infrastructure to support telephone calls over the Internet. IP telephony can further be utilized to provide conventional phone-to-phone communications instead of IP telephony for computer systems and networked devices.

A great business potential and communication efficiency may be realized if IP telephony is further intricately integrated to electronic transactions, Internet services, and/or other business applications beyond a simple voice-to-voice VoIP applications currently enabled by VoIP providers such as Skype and Net2Phone. The present invention captures novel concepts for integrated applications of IP telephony, electronic transactions, and online services.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a method for communicating a text-to-speech (TTS) reminder phone call to a recipient's voicemail for improvement of transaction success rates is disclosed. This method comprises the steps of transmitting the text-to-speech (TTS) reminder phone call to a recipient's voice-capable device at a recipient's desired date and time or at a recipient's desired dynamic event; delivering the text-to-speech (TTS) reminder phone call to the recipient's voicemail because the recipient's voice-capable device routes the text-to-speech (TTS) reminder phone call to the recipient's voicemail, wherein a text-to-speech (TTS) alert system delivering the text-to-speech (TTS) reminder phone call may be configured to detect a routing scheme to the recipient's voicemail to record at least a portion of a message from the text-to-speech (TTS) reminder phone call, a centralized or a recipient-specific call-back phone number, and/or a transaction identifier number in the recipient's voicemail; identifying a recipient using the recipient-specific call-back phone number and/or the transaction identifier if the recipient calls back to the text-to-speech (TTS) alert system; and re-transmitting and replaying the text-to-speech (TTS) reminder phone call when the recipient calls back to the text-to-speech (TTS) alert system, wherein the recipient may be given an opportunity to authorize, authenticate, and/or complete a transaction if the text-to-speech (TTS) reminder phone call involves a transaction of products or services.

Furthermore, in another embodiment of the invention, a method for reducing online shopping cart abandonment rates is disclosed. This method comprises the steps of enabling a consumer to browse an e-commerce website, wherein the e-commerce website incorporated a shopping cart abandonment reduction interface linked to a text-to-speech (TTS) alert system such as TagToe; allowing the consumer to place one or more items in a shopping cart of the e-commerce website which incorporated the shopping cart abandonment reduction interface; detecting an attempt to leave the e-commerce website by the consumer before completing a purchase transaction of the one or more items in the shopping cart; preventing the consumer from leaving the e-commerce website at least once; generating a message on a consumer's computer screen to encourage the consumer to use a purchase reminder user interface linked to the text-to-speech (TTS) alert system such as TagToe to schedule a purchase reminder phone call; and enabling the consumer to select and/or enter a desirable date and time for the purchase reminder phone call, a dynamic event which triggers the purchase reminder phone call, and/or a purchase reminder entry into an online calendar.

BRIEF DESCRIPTION OF DRAWINGS

FIG. 16 shows a second screenshot for a shopping-cart abandonment reduction method in accordance with an embodiment of the invention.

DETAILED DESCRIPTION

Figure 1:
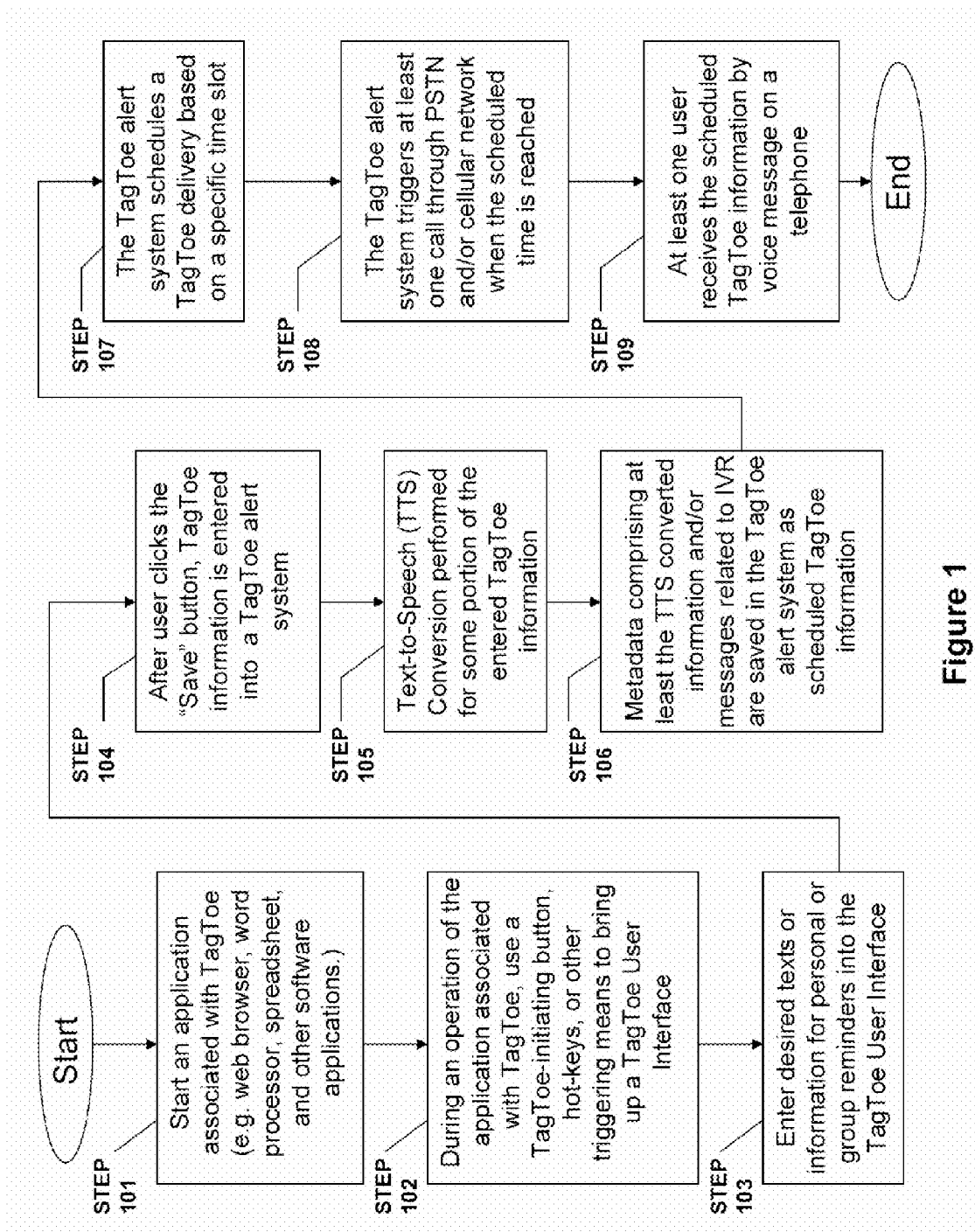
FIG. 1 shows a first flowchart for an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of procedures, logic blocks, processing, and other symbolic representations that directly or indirectly resemble methods for generating sales and/or transaction commissions from e-commerce transaction assistance and various voice reminder applications in e-commerce. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

In general, embodiments of the invention relate to a voice reminder system using VoIP. In particular, the invention relates to methods for generating sales and/or transaction commissions from e-commerce transaction assistance for a TagToe reminder provider. Furthermore, the invention also relates to various voice reminder applications in e-commerce, in accordance with one or more embodiments of the invention.

Even with ubiquity of the Internet for text-based electronic communication methods such as the world wide web and emails in today's world, voice communications enabled by IP telephony hold some key potential advantages in online scheduling, meeting reminders, e-commerce transaction services, and any other time-sensitive or time-defined services.

For example, conventional e-mail reminders are frequently missed because a computer user may not be sitting in front of a computer accessing a particular web-mail site or an email program. Therefore, an important client-related e-mail meeting reminder may be neglected and forgotten if the computer user either does not have a computer access or forgets to access email box some time prior to the actual meeting time. Likewise, shopping items placed on a "wish list" of an Internet store could be forgotten by a shopper accidentally, which results in substantial loss of "realizable" revenue by the Internet store.

Furthermore, other text-based reminders such as text messages (e.g. SMS) to cell phones are frequently ignored nowadays because numerous marketing text messages or other relevant messages may inundate a cell phone user's text mail box at any given day. Therefore, text-based reminders in form of emails, SMS's, and/or text alerts may be too passive as an alert in some circumstances.

In contrast, if text-to-speech-converted voice reminder services are integrated in a variety of Internet web services to call a cell phone or a landline telephone, they provide unique and novel enablement of proactive reminders and services to call recipients. The passive aspects of text-based reminders, as explained previously, directly contrast the proactive aspects of voice reminder services.

The potential and the promise of integrating text-to-speech-converted voice reminder services to Internet web services are compelling. Observations of human and electronic device interactions suggest that most users are likely to pick up a phone to receive calls if they are present and available. On the other hand, text-based reminders are often too passive as a reminding tool because they are frequently forgotten or neglected at the time of receipt due to a lack of computer access or sometimes a lack of attention.

For the purpose of describing the invention, the term "TagToe" is defined as a time-triggered or a dynamic event-triggered voice alert system which converts at least some textual information to voice data and schedules voice calls to one or more intended recipients at a specified "time trigger" or at a specified "dynamic event". An example of a "time trigger" is a recipient's self-selected date and time for a scheduled voice reminder call (i.e. a "TagToe reminder"). On the other hand, an example of a "dynamic event" is a lowered price of a product or a service to a recipient's self-selected threshold level (e.g. a laptop computer of the recipient's interest falls to $400, which was the recipient's selected threshold level). TagToe can be used as a standalone web service, as a plug-in application to a plurality of software applications, or as integrated business applications to Internet stores or web portal services.

Furthermore, for the purpose of describing the invention, a term "consumer" is defined as a user or a potential customer of goods and/or services offered by an e-commerce provider.

Moreover, for the purpose of describing the invention, a term "TagToe reminder provider" is defined as an entity providing a "TagToe service," or a service based on a time-triggered or a dynamic event-triggered voice alert system which converts at least some textual information to voice data and schedules voice calls to one or more intended recipients at a specified time trigger or at a specified dynamic event.

In addition, for the purpose of describing the invention, a term "TagToe reminder" is defined as a voice reminder message based a time-triggered or a dynamic event-triggered voice alert system which converts at least some textual information to voice data and schedules voice calls to one or more intended recipients at a specified time trigger or at a specified dynamic event. One type of a TagToe reminder is a "TagToe purchase reminder," which is a voice-based purchase reminder message generated by a time-triggered or a dynamic event-triggered voice alert system (i.e. TagToe).

Furthermore, for the purpose of describing the invention, a term "item" is defined as a product and/or service offered by an e-commerce provider.

The present invention discloses methods for generating profits (i.e. in form of sales and/or transaction commissions) from "TagToe" technology. The present invention also discloses various voice reminder applications in e-commerce using the TagToe technology.

FIG. 1 shows a flowchart for a TagToe-enabled software application operatively connected to a TagToe alert system in accordance with an embodiment of the invention. In this particular embodiment of the invention, a user starts a software application associated with TagToe, as shown in STEP 101. The software application can be a web browser, a word processor program, a spreadsheet program, or any other conventional software applications. Then, during an operation of the software application associated with TagToe, the user can initiate a TagToe reminder by clicking on a TagToe button, a hot-key designated for TagToe, or any other TagToe triggering means to bring up a TagToe user interface, as shown in STEP 102.

In STEP 103, the user enters and/or selects desired texts or a group of information in the TagToe user interface. In one embodiment of the invention, a specific time slot for a TagToe reminder transmission to one or more call recipients is entered or chosen in the TagToe user interface by the user. Then, the user typically clicks an "Okay" or a "Save" button to store the entered and/or the selected information into a data storage in a TagToe alert system, as shown in STEP 104. In one embodiment of the invention, the data storage is a main TagToe reminder server remotely connected to the user's computer via a computer network. In another embodiment of the invention, the data storage is simply a local information storage medium, such as a hard disk or a solid-state non-volatile memory contained in the user's computer.

Continuing with FIG. 1, the TagToe alert system operatively connected to the TagToe-enabled software application performs text-to-speech (TTS) conversion on some or all portions of the entered and/or the selected text information, as shown in STEP 105. Then, in one embodiment of the invention, metadata comprising the text-to-speech converted information and/or other information related to a particular software application, online services, users, or TagToe recipients are saved in the TagToe alert system, as shown in STEP 106. Examples of "other information" related to a particular software application, online services, users, or TagToe recipients include interactive voice response (IVR) which is configured to allow TagToe recipients to make selections for services provided by the particular software application or online services.

In another embodiment of the invention, STEP 106 is simply skipped and only the text-to-speech converted information from STEP 105 is saved in the TagToe alert system as a finalized TagToe reminder for a scheduled call delivery. After text-to-speech (TTS) conversion and storing of the converted voice data in the TagToe alert system, the TagToe alert system schedules a TagToe delivery based on a specific time slot, as shown in STEP 107. In one embodiment of the invention, the specified time slot for a TagToe reminder transmission is entered or chosen by the user in STEP 103 and the specified time is fetched by the TagToe alert system to schedule a delivery. Then, in STEP 108, the TagToe alert system triggers at least one call through a public-switched telephone network (PSTN) and/or cellular phone network when a scheduled delivery time is reached. In one embodiment of the invention, the call transmission at least partly uses voice-over-IP (VoIP) technology for TagToe reminder deliveries. In STEP 109, at least one intended recipient receives a TagToe reminder by voice telephone call containing at least some portion of the TagToe information originally entered and/or selected by the user.

Figure 2:
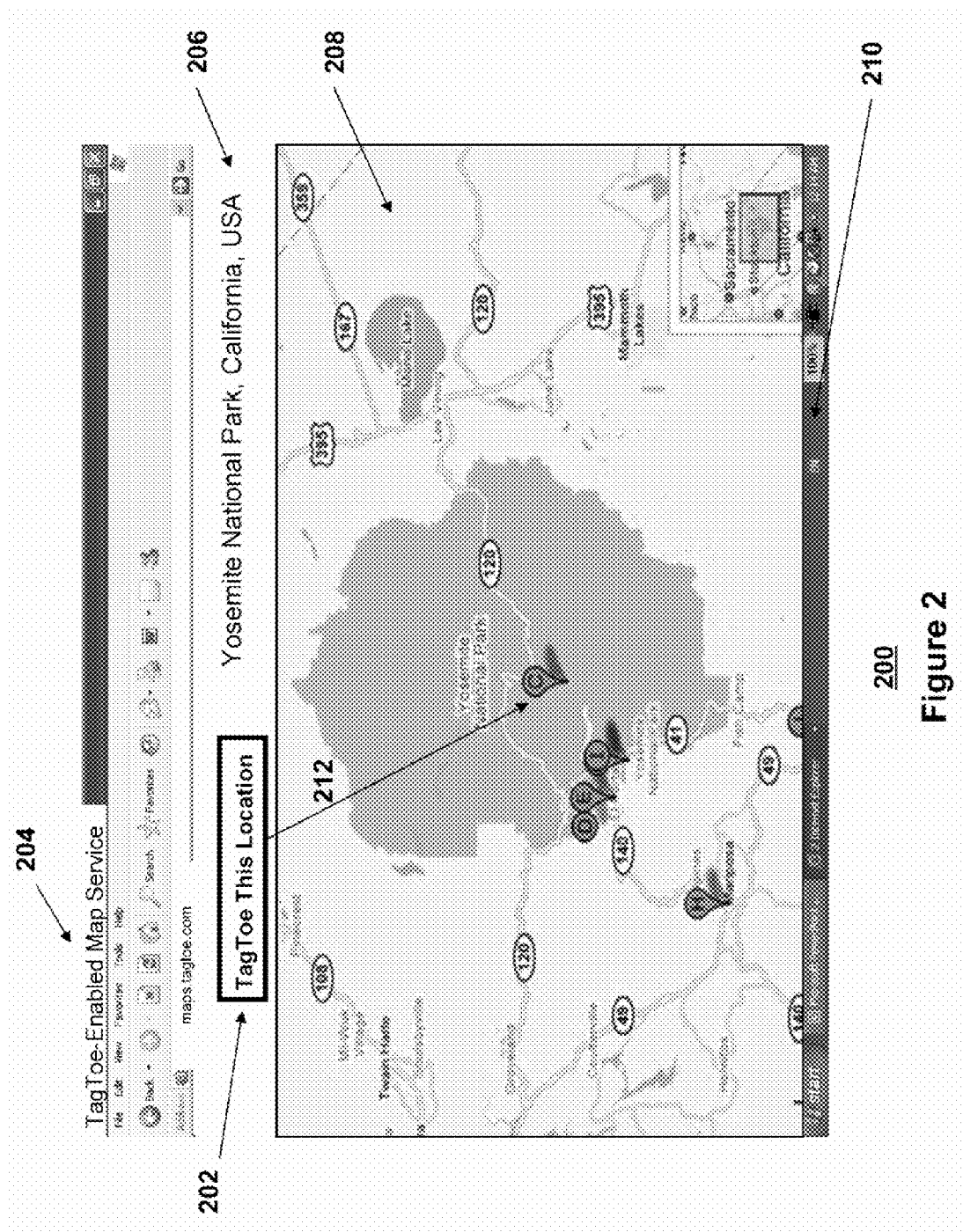
FIG. 2 shows a screenshot of a first software application using an embodiment of the invention.

FIG. 2 shows a first screenshot for a first practical example of a TagToe-enabled application utilizing the TagToe alert system. In this example, the TagToe-enabled application is a web browser (200) accessing an online map service site (204). In one embodiment of the invention, the web browser (200) is running within a Microsoft Windows operating system environment (210). A TagToe-initiating button (202) is embedded in the online map service site (204) or embedded in the web browser (200) itself as a plug-in application. The online map service site (204) is currently showing vicinities surrounding Yosemite National Park in California, as shown by the map location indicator (206). The map area field (208) contains many points of interest, roads, geographic designations, and other relevant information.

In the first screenshot, the TagToe-initiating button (202) is pointing to a point of interest "C" by using an arrow (212) in the map area field (208). In one embodiment of the invention, a web browser user can simply move the arrow (212) to a particular point of interest within the map area field (208) to pinpoint a desired location.

Figure 3:
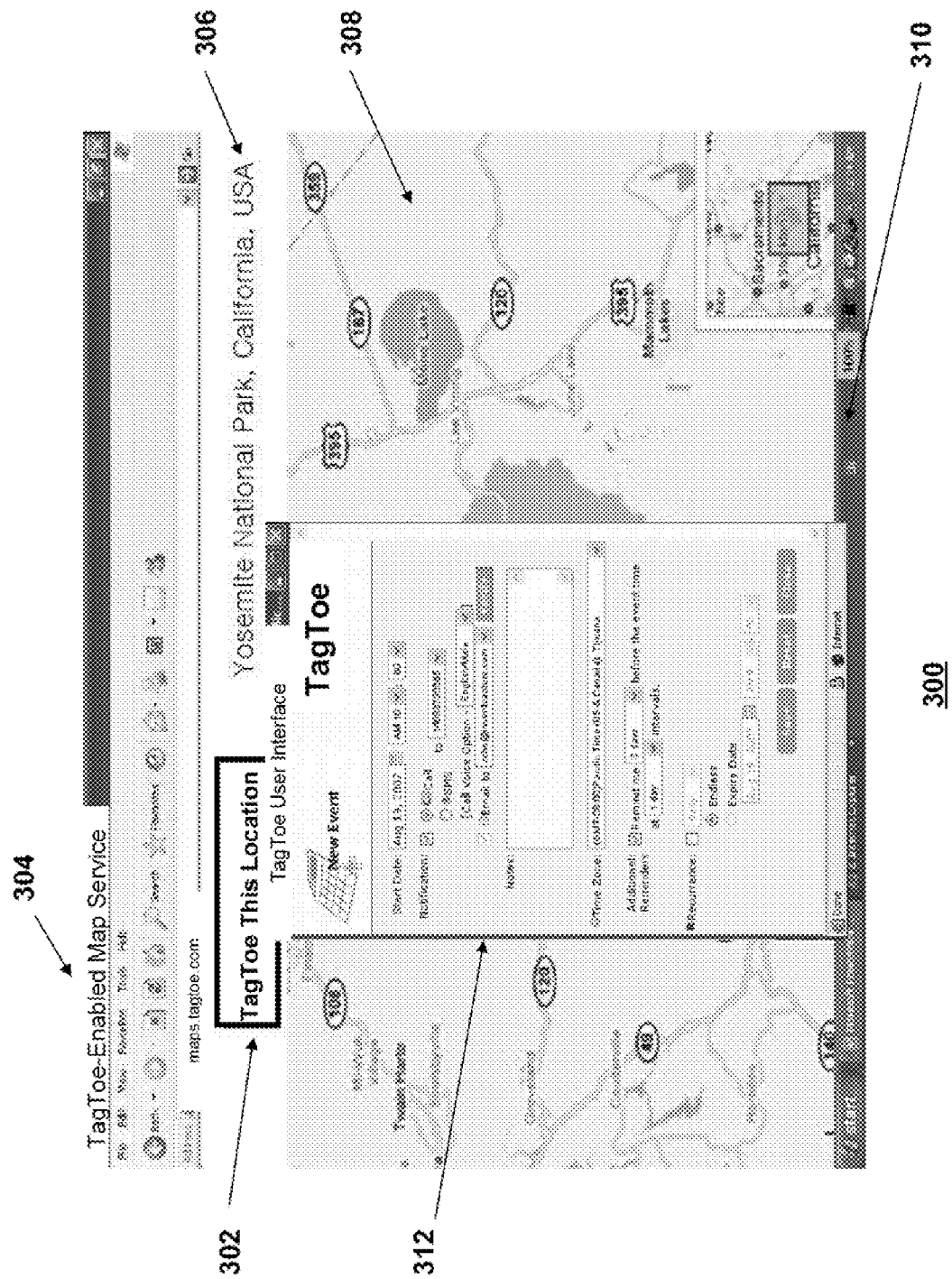
FIG. 3 shows another screenshot of the first software application using an embodiment of the invention.

FIG. 3 shows a second screenshot for the first practical example of the TagToe-enabled application utilizing the TagToe alert system. In the second screenshot shown in FIG. 3 following the first screenshot shown in FIG. 2, the web browser user clicks on the TagToe-initiating button (302) to bring a TagToe user interface (312). Because the TagToe-initiating button (302) pointed to the point of interest "C" by using the arrow (212) in the map area field (208) in the first screen, the TagToe user interface (312) automatically integrates geographic information related to the point of interest "C" as a "location to remind people" or as a meeting location.

Figure 4:
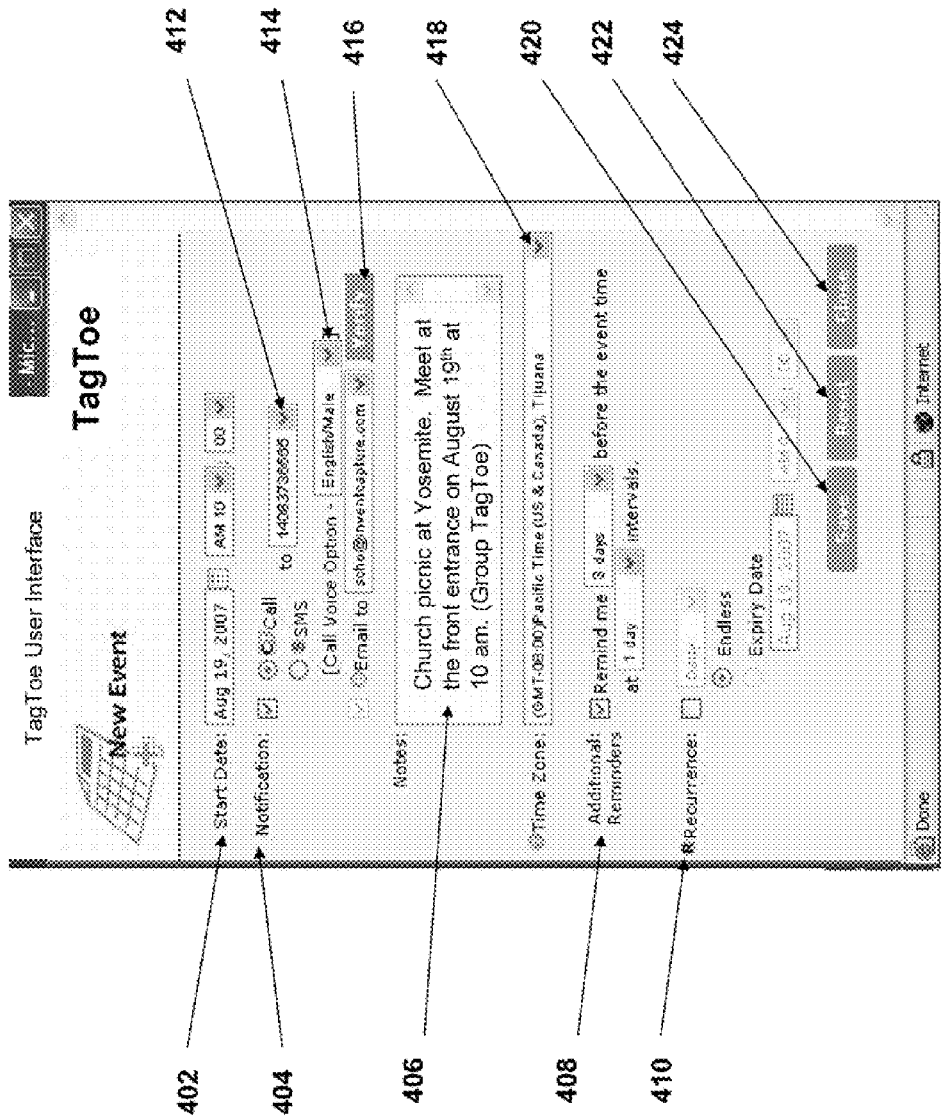
FIG. 4 shows another screenshot of the first software application using an embodiment of the invention.

FIG. 4 shows a third screenshot for the first practical example of the TagToe-enabled application utilizing the TagToe alert system. In the third screenshot shown in FIG. 4, an example of detailed fields for the TagToe user interface (400) is displayed. In one embodiment of the invention, the web browser user accessing the online map service site (204) can choose a meeting time or a TagToe reminder time slot (402). The web browser user can also select several modes of reminders, including a TagToe reminder call to an intended recipient (412), an SMS message, or an email. More than one recipient can receive a variety of different types of reminders depending on the user input. For TagToe reminder voice options, the web browser user accessing the online map service site (204) can also choose types of voices and languages. In one embodiment of the invention, an internal translation program can translate one language to another during text-to-speech conversion process. Therefore, if a recipient's preferred language profile is Spanish instead of English, then English textual messages originally-entered into a TagToe-enabled application can be converted to a Spanish voice message during the text-to-speech conversion process before the TagToe alert system schedules a TagToe reminder for delivery.

Continuing with FIG. 4, an email verification button (416) ensures that an email notification does not bounce back due to an incorrect email address. In this example, the web browser user enters Church picnic information for a group meeting in Yosemite for a specific time in a text-entry field (406). Information entered into the text-entry field (406) can go through text-to-speech conversion process later for TagToe reminders (i.e. text-to-speech voice message delivery) to one or more desired telephone call recipients.

In the TagToe user interface (400), a time zone field (418) allows the web browser user to use a desired time zone for meeting reminder scheduling and delivery. The web browser user can also add additional reminders (408) by specifying a recurring reminder interval and/or an additional reminder date prior to the meeting time (402). Further field selection for recurring reminders can be made by configuring recurrence fields (410).

Continuing with FIG. 4, the entered and the selected fields can be saved, reset, or closed by using a "Save" button (420), a "Reset" button (422), or a "Close" button (424). In this particular example, if the "Close" button (424) or the "Reset" button (422) is selected, the web browser user may be asked to confirm saving field information prior to closing the TagToe user interface (400).

If the field information is saved through the TagToe user interface (400), the TagToe alert system performs necessary text-to-speech conversion and schedules TagToe reminder deliveries, email notifications, and/or SMS messages to one or more intended recipients. The first practical example of TagToe-enabled application utilizing the TagToe alert system showcases how the online map service site (204) can provide an integrated IP telephony and web service experience to end users. In this particular example, the TagToe technology provides means of text-to-speech (TTS) voice meeting reminders to intended recipients using their telephone numbers. By inherently integrating map location service and its address information to group "TagToe" meeting reminders initiated by at least one web browser user, the online map service site (204) is able to provide an advanced level of proactive location and meeting reminders to TagToe recipients.

Figure 5:
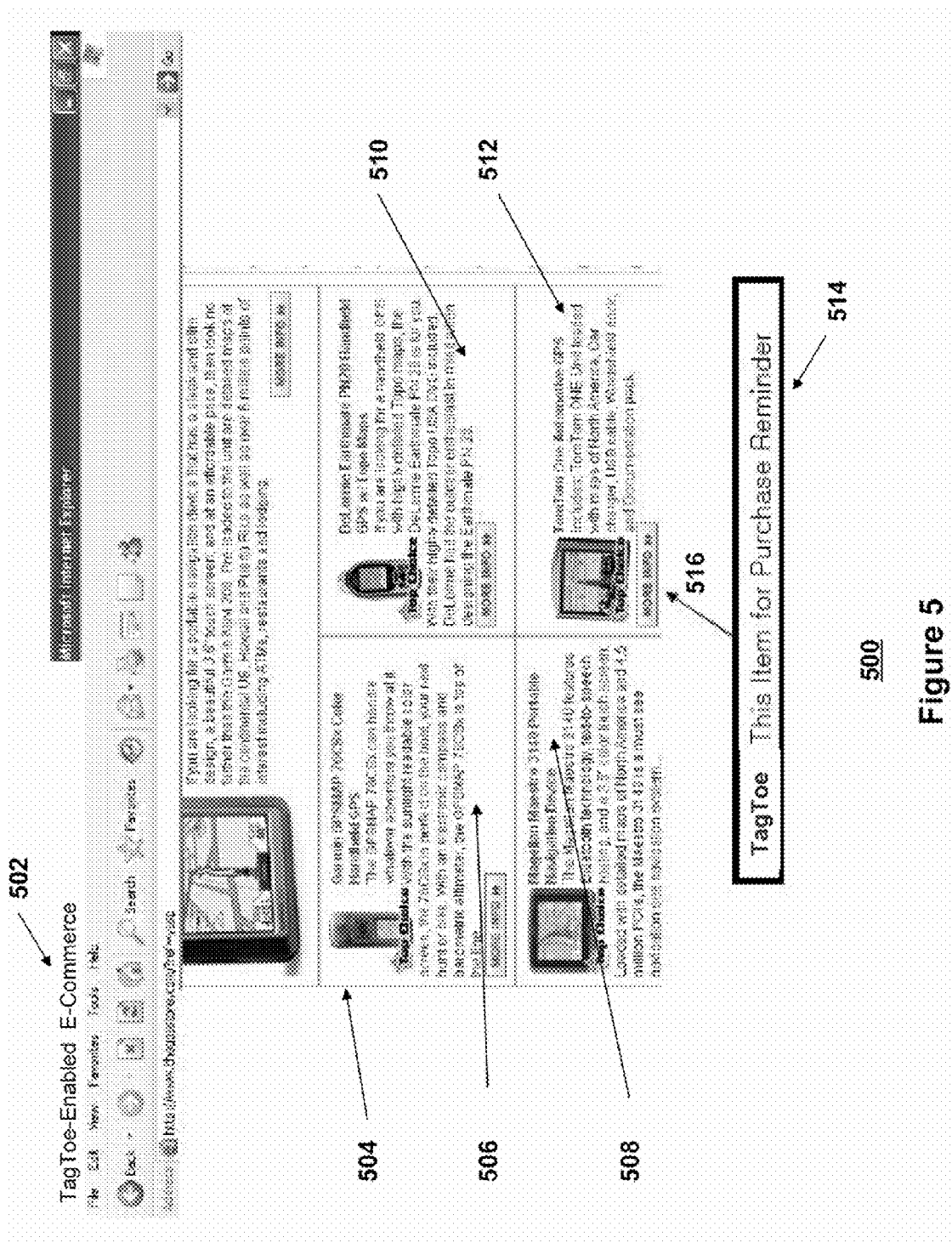
FIG. 5 shows a screenshot of a second software application using an embodiment of the invention.

FIG. 5 shows a first screenshot for a second practical example of the TagToe-enabled application utilizing the TagToe alert system. In this example, the TagToe-enabled application is a web browser (500) accessing an online shopping site (502). In one embodiment of the invention, the web browser (500) is running within a Microsoft Windows operating system environment. In this particular example, the online shopping site shows a variety of GPS navigation systems (506, 508, 510, 512) in a online store content page (504).

A TagToe-initiating button (514) is embedded in the online shopping site (502) or embedded in the web browser (500) itself as a plug-in application. The TagToe-initiating button (514) has an arrow (516) to point to a particular product of interest. In this particular case, the user configured the arrow (516) to point to a GPS navigational unit (512). The second practical example showcasing the TagToe technology accommodates a TagToe purchase reminder for the online shopping site (502), which is more proactive than a conventional "wish list" or user-initiated email reminders. By providing proactive user-initiated voice reminders for a future purchase of a product, online stores can achieve substantial revenue increase by integrating the TagToe technology to e-commerce infrastructure. For example, an interactive voice response (IVR) system which is integrated with the TagToe technology and electronic transaction systems can provide a telephonic purchase of the "TagToe-ed" product after a simple identity authentication of a particular call recipient. In another example, the TagToe purchase reminder can be used simply as a self-reminder to a consumer that she or he needs to purchase a product, which motivates the consumer to log-in to an online store correlated to the TagToe purchase reminder to make a purchase.

Figure 6:
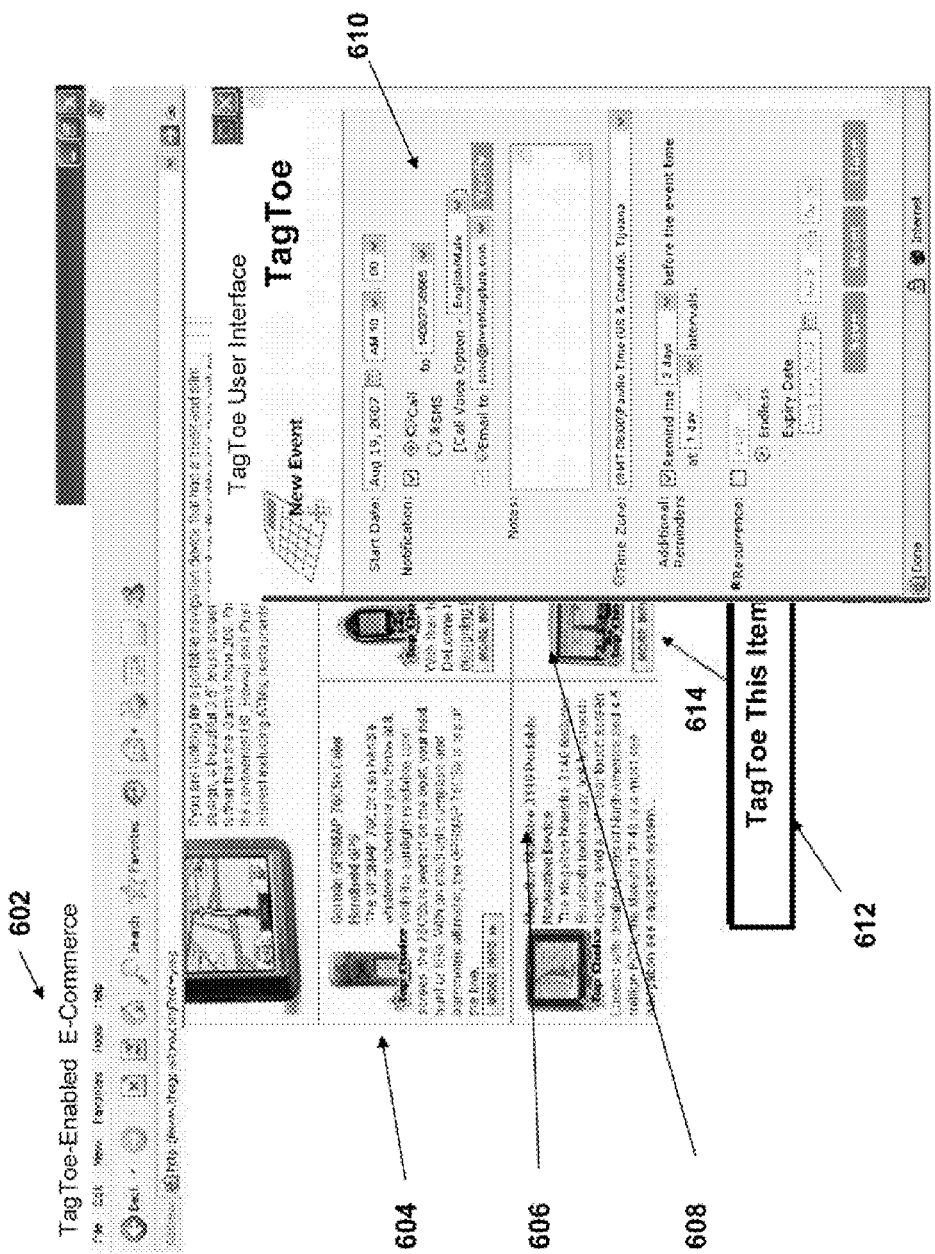
FIG. 6 shows another screenshot of the second software application using an embodiment of the invention.

FIG. 6 shows a second screenshot for the second practical example of the TagToe-enabled application utilizing the TagToe alert system. In the second screenshot shown in FIG. 6 following the first screenshot shown in FIG. 5 for the online shopping site (502), the web browser user clicks on a TagToe-initiating button (612) to bring a TagToe user interface (610). Because the TagToe-initiating button (612) pointed to the GPS navigation unit (512) by using the arrow (516) in the online shopping site (502) in FIG. 5, the TagToe user interface (610) automatically integrates product information related to a corresponding GPS navigation unit (608). In FIG. 6, the TagToe-initiating button (612) points to the corresponding GPS navigation unit (608) with an arrow (614). In one embodiment of the invention, an integration of product information to the TagToe technology in e-commerce IT infrastructure is sufficient to accommodate a rapid and efficient telephone-based purchase (e.g. an IVR system) when an intended call recipient receives a TagToe purchase reminder.

Figure 7:
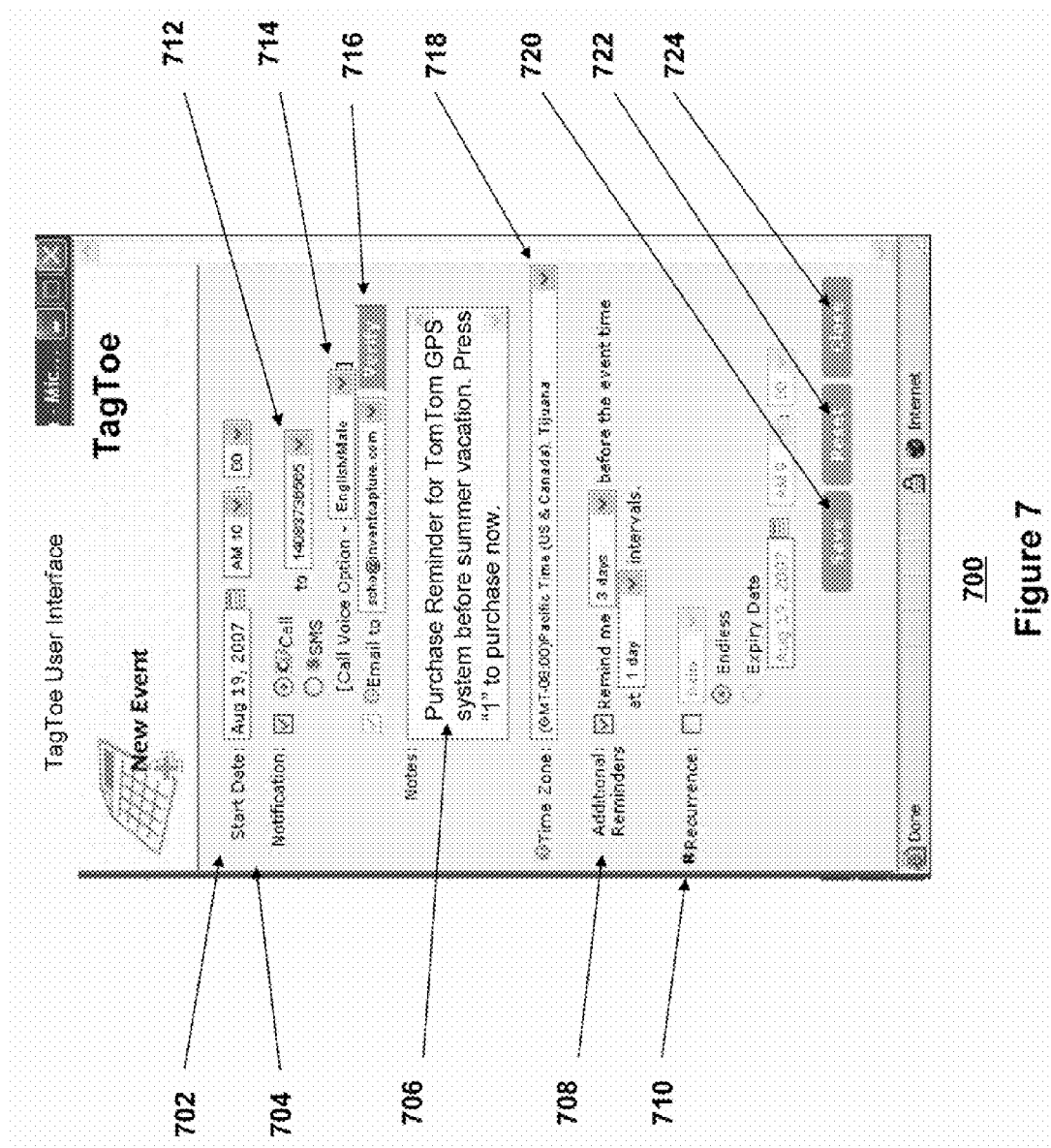
FIG. 7 shows another screenshot of the second software application using an embodiment of the invention.

FIG. 7 shows a third screenshot for the second practical example of the TagToe-enabled application utilizing the TagToe alert system. In the third screenshot shown in FIG. 7, an example of detailed fields for the TagToe user interface (700) is displayed. In one embodiment of the invention, the web browser user accessing the online shopping site (502) can choose a future purchase time or a purchase reminder time at a specified time slot (702). The web browser user can also select several modes of reminders, including a TagToe reminder call to an intended recipient (712), an SMS message, or an email. More than one recipient can receive a variety of different types of reminders depending on the user input. In one embodiment of the invention, TagToe purchase reminders generally require pre-TagToe authorizations by intended call recipients to avoid unauthorized telemarketing applications of the TagToe technology. For example, when the web browser user wants to add a telephone number as a TagToe recipient, the TagToe alert system first sends an authorization code to the telephone number for the call recipient authentication and authorization purposes. Other elaborate authentication and/or authorization schemes may be used to protect the privacy of prospective TagToe recipients. For TagToe reminder voice options, the web browser user accessing the online shopping site (502) can also choose types of voices and languages. In one embodiment of the invention, an internal translation program can translate one language to another during text-to-speech (TTS) conversion process. Therefore, if a recipient's preferred language profile is Spanish instead of English, then English textual messages originally-entered into a TagToe-enabled application can be converted to a Spanish voice message during the text-to-speech conversion process before the TagToe alert system schedules a TagToe reminder for delivery.

Continuing with FIG. 7, an email verification button (716) ensures that an email notification does not bounce back due to an incorrect email address. In this example, the web browser user enters a purchase reminder for a desired GPS system before his or her summer vacation for a specific time in a text-entry field (706). Information entered into the text-entry field (706) can go through text-to-speech conversion process later for TagToe reminders (i.e. text-to-speech voice message delivery) to one or more desired telephone call recipients.

In the TagToe user interface (700), a time zone field (718) allows the web browser user to use a desired time zone for meeting reminder scheduling and delivery. The web browser user can also add additional reminders (708) by specifying a recurring reminder interval and/or an additional reminder time prior to the meeting time (702). Further field selection for recurring reminders can be made by configuring recurrence fields (710).

Continuing with FIG. 7, the entered and the selected fields can be saved, reset, or closed by using a "Save" button (720), a "Reset" button (722), or a "Close" button (724). In this particular example, if the "Close" button (724) or the "Reset" button (722) is selected, the web browser user may be asked to confirm saving field information prior to closing the TagToe user interface (700).

If the field information is saved through the TagToe user interface (700), the TagToe alert system performs necessary text-to-speech conversion and schedules TagToe reminder deliveries, email notifications, and/or SMS messages to one or more intended recipients. The second practical example of TagToe-enabled application utilizing the TagToe alert system showcases how the online shopping site (502) can provide an integrated IP telephony and web service experience to end users. In this particular example, the TagToe technology provides means of text-to-speech (TTS) voice purchase reminders to intended recipients using their telephone numbers. In one embodiment of the invention, the TagToe technology is further integrated into the e-commerce IT infrastructure to provide means of immediate telephonic purchase of reminded items when the intended recipients receive TagToe reminders. By inherently integrating an e-commerce infrastructure, product information, and the TagToe technology, the online store site (502) is able to provide an advanced level of proactive purchase reminders and telephonic purchase methods to TagToe recipients.

Figure 8:
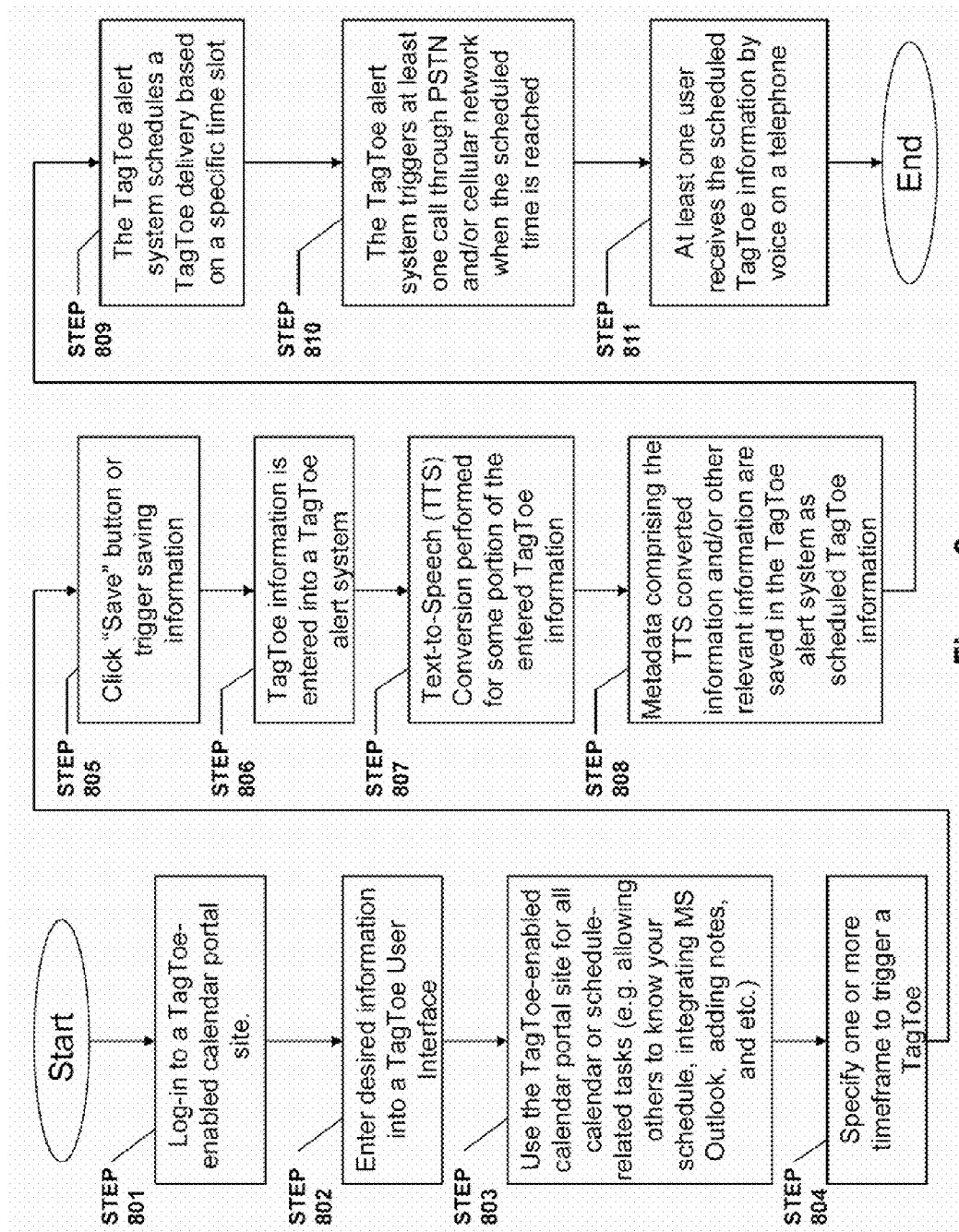
FIG. 8 shows a second flowchart for an embodiment of the invention.

FIG. 8 shows a flowchart for a TagToe-enabled calendar portal site operatively connected to a TagToe alert system in accordance with an embodiment of the invention. This is a preferred embodiment of the invention for the TagToe alert system. In this particular embodiment of the invention, a user logs-in to the TagToe enabled calendar portal site, as shown in STEP 801. Then, the user can either first enter and/or select desired information into a TagToe user interface, as shown in STEP 802, or first use the TagToe-enabled calendar portal site for calendar or scheduling-related tasks, as shown in STEP 803. The order of flow for STEP 802 and STEP 803 is interchangeable (i.e. STEP 803 can precede STEP 802). In one embodiment of the invention, for STEP 802, the user can bring up a TagToe user interface by clicking on a TagToe button, a hot-key designated for TagToe, or any other TagToe user interface triggering means. In another embodiment of the invention, the user can trigger a "new event" from the calendar portal site to bring up a TagToe user interface.

In STEP 802, the user enters and/or selects desired texts or a group of information in the TagToe user interface. In one embodiment of the invention, a specific time slot for a TagToe reminder transmission to one or more call recipients is entered or chosen in the TagToe user interface by the user.

In STEP 803, the user utilizes the TagToe-enabled calendar portal site for calendar or scheduling related tasks. Examples of the calendar or scheduling related tasks include adding notes to one's schedule, configuring schedule-view authorizations for other users, and arranging meetings with others. As stated previously, STEP 803 can precede STEP 802 in some cases. As an optional step, the user can specify one or more timeframe to trigger a TagToe reminder by entering and/or selecting information in the TagToe user interface, as shown in STEP 804.

Then, the user typically clicks an "Okay" or a "Save" button to store the entered and/or the selected information into a data storage in a TagToe alert system, as shown in STEP 805 and STEP 806. In one embodiment of the invention, the data storage is a main TagToe reminder server remotely connected to the user's computer via a computer network. In another embodiment of the invention, the data storage is simply a local information storage medium, such as a hard disk or a solid-state non-volatile memory contained in the user's computer.

Continuing with FIG. 8, the TagToe alert system operatively connected to the TagToe-enabled calendar portal site performs text-to-speech (TTS) conversion on some or all portions of the entered and/or the selected text information, as shown in STEP 807. Then, in one embodiment of the invention, metadata comprising the text-to-speech converted information and/or other relevant information are saved in the TagToe alert system, as shown in STEP 808. Examples of "other relevant information" include interactive voice response (IVR) which is configured to allow TagToe recipients to make selections for available services such as a teleconference call among a plurality of TagToe recipients.

In another embodiment of the invention, STEP 808 is simply skipped and only the text-to-speech converted information from STEP 807 is saved in the TagToe alert system as a finalized TagToe reminder for a scheduled call delivery.

After text-to-speech (TTS) conversion and storing of the converted voice data in the TagToe alert system, the TagToe alert system schedules a TagToe delivery based on a specific time slot, as shown in STEP 809. In one embodiment of the invention, the specified time slot for a TagToe reminder transmission is entered or chosen by the user in STEP 802 and the specified time is fetched by the TagToe alert system to schedule a delivery. Then, in STEP 810, the TagToe alert system triggers at least one call through a public-switched telephone network (PSTN) and/or cellular phone network when a scheduled delivery time is reached. In one embodiment of the invention, the call transmission at least partly uses voice-over-IP (VoIP) technology for TagToe reminder deliveries. In STEP 811, at least one intended recipient receives a TagToe reminder by voice telephone call containing at least some portion of the TagToe information originally entered and/or selected by the user.

Figure 9:
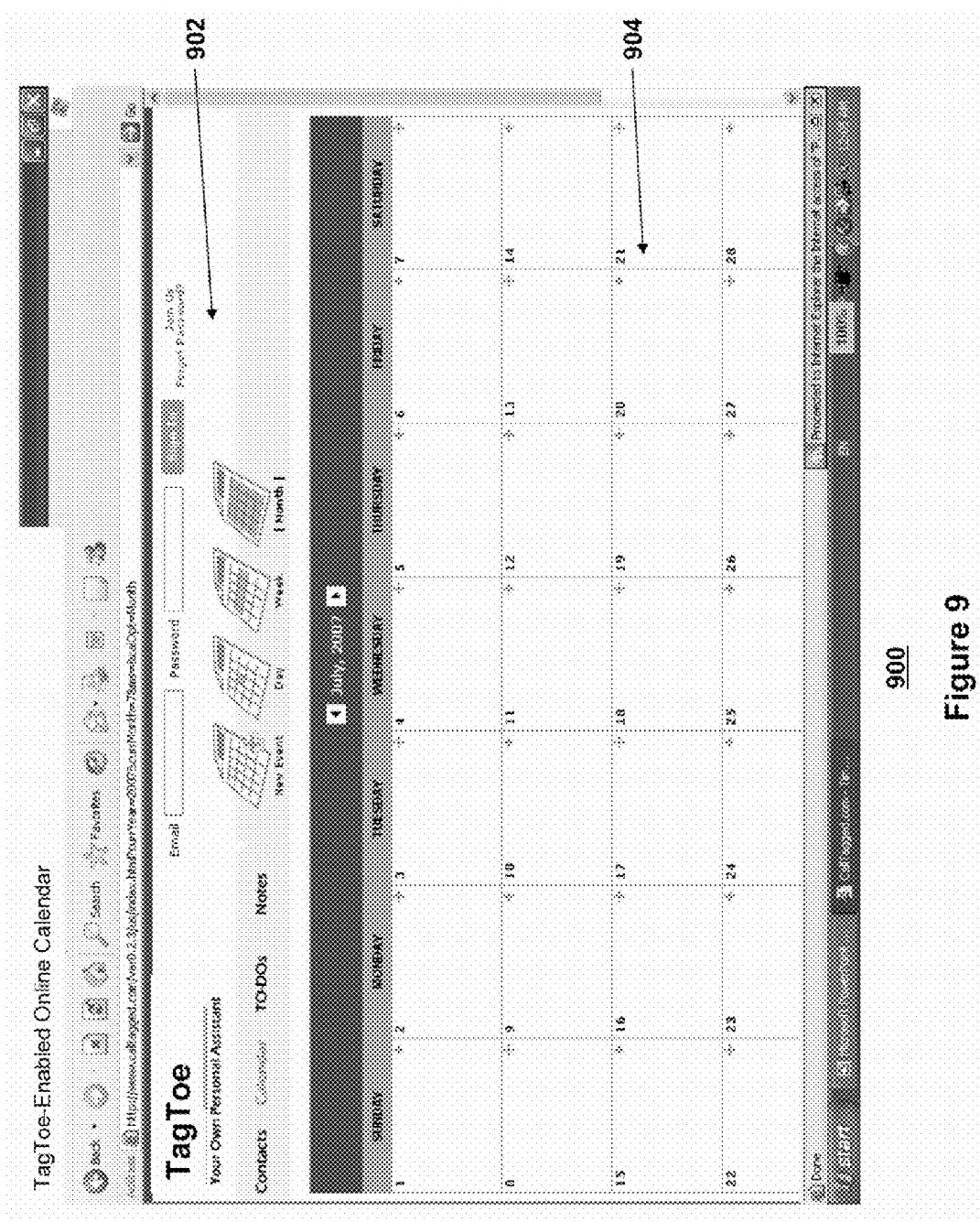
FIG. 9 shows a screenshot of a third software application using an embodiment of the invention.

FIG. 9 shows a first screenshot of a TagToe-enabled calendar portal site (900). In one embodiment of the invention, the TagToe-enabled calendar portal site (900) has a menu selection section (902) and an calendar event entry section (904). The menu selection section (902) can contain any features and/or services suitable for online calendar and scheduling functions, including contact lists, note pads, and calendar views by day, week, and month. In one embodiment of the invention, the calendar event entry section (904) opens up a TagToe user interface when a "+" button is clicked on the calendar event entry section.

Figure 10:
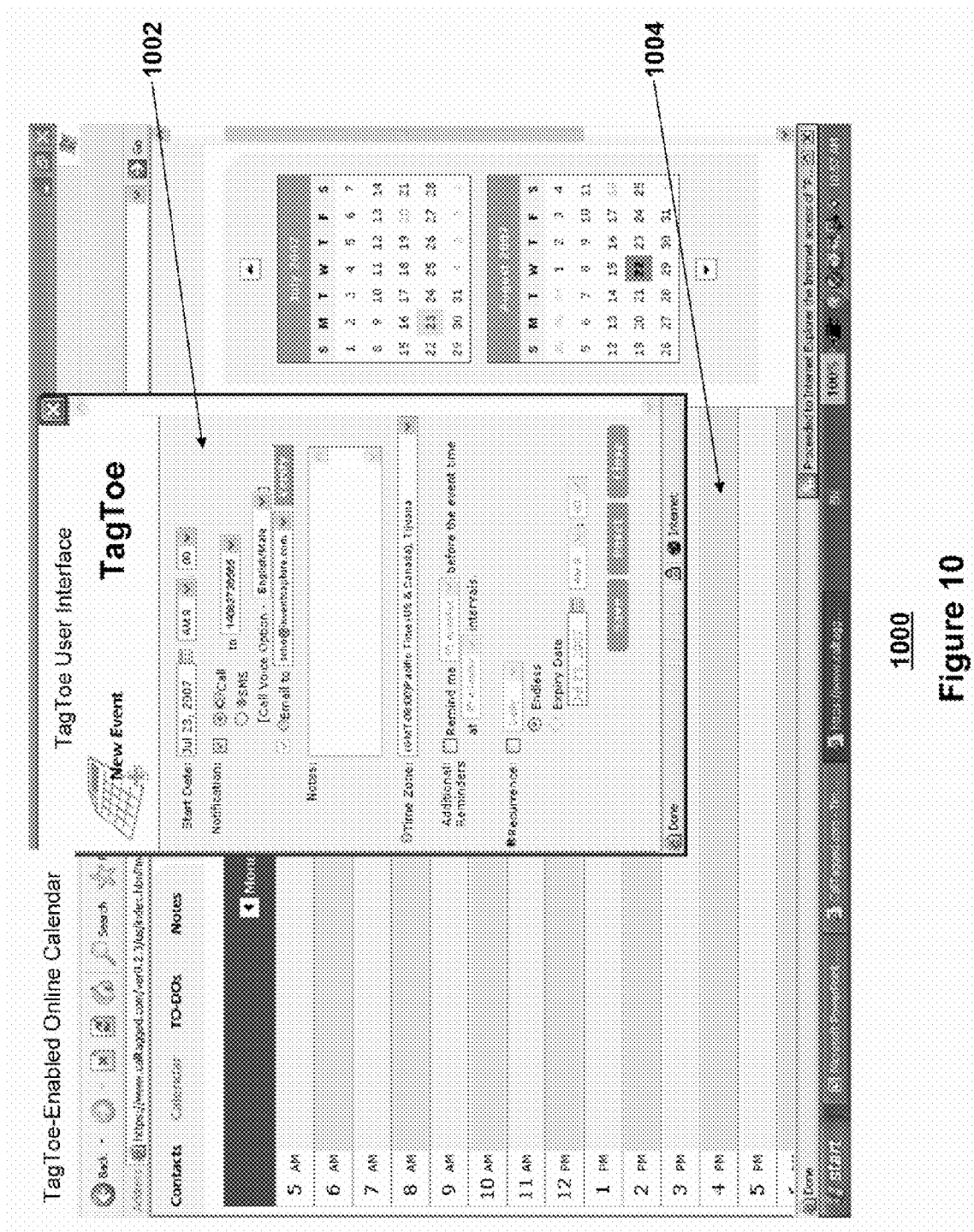
FIG. 10 shows a screenshot of the third software application using an embodiment of the invention.

FIG. 10 shows a second screenshot of the TagToe-enabled calendar portal site (1000). In one embodiment of the invention, when a user clicks on the "+" button from the calendar event entry section (904) from FIG. 9, a TagToe user interface (1002) is triggered for entering notes and setting TagToe reminders at a particular time slot. If the user saves entered notes and TagToe reminder settings in the TagToe user interface (1002), a corresponding time slot in the calendar event entry section will reflect the entered notes and/or the TagToe reminder settings. When a scheduled time slot is reached based on the TagToe reminder settings, an TagToe alert system operatively connected to the TagToe-enabled portal site can trigger a telephone call to deliver the entered notes or other relevant online scheduling information to at least one intended TagToe recipients. Intended TagToe recipients typically include the user who wrote and saved notes in the TagToe user interface (1002) for future text-to-speech delivery of the saved notes.

In one embodiment of the invention, the TagToe-enabled calendar portal site is further configured to accommodate conference calls among several TagToe recipients. An interactive voice response (IVR) system can be utilized to give each TagToe recipient an opportunity to participate in one or more conference calls.

Figure 11:
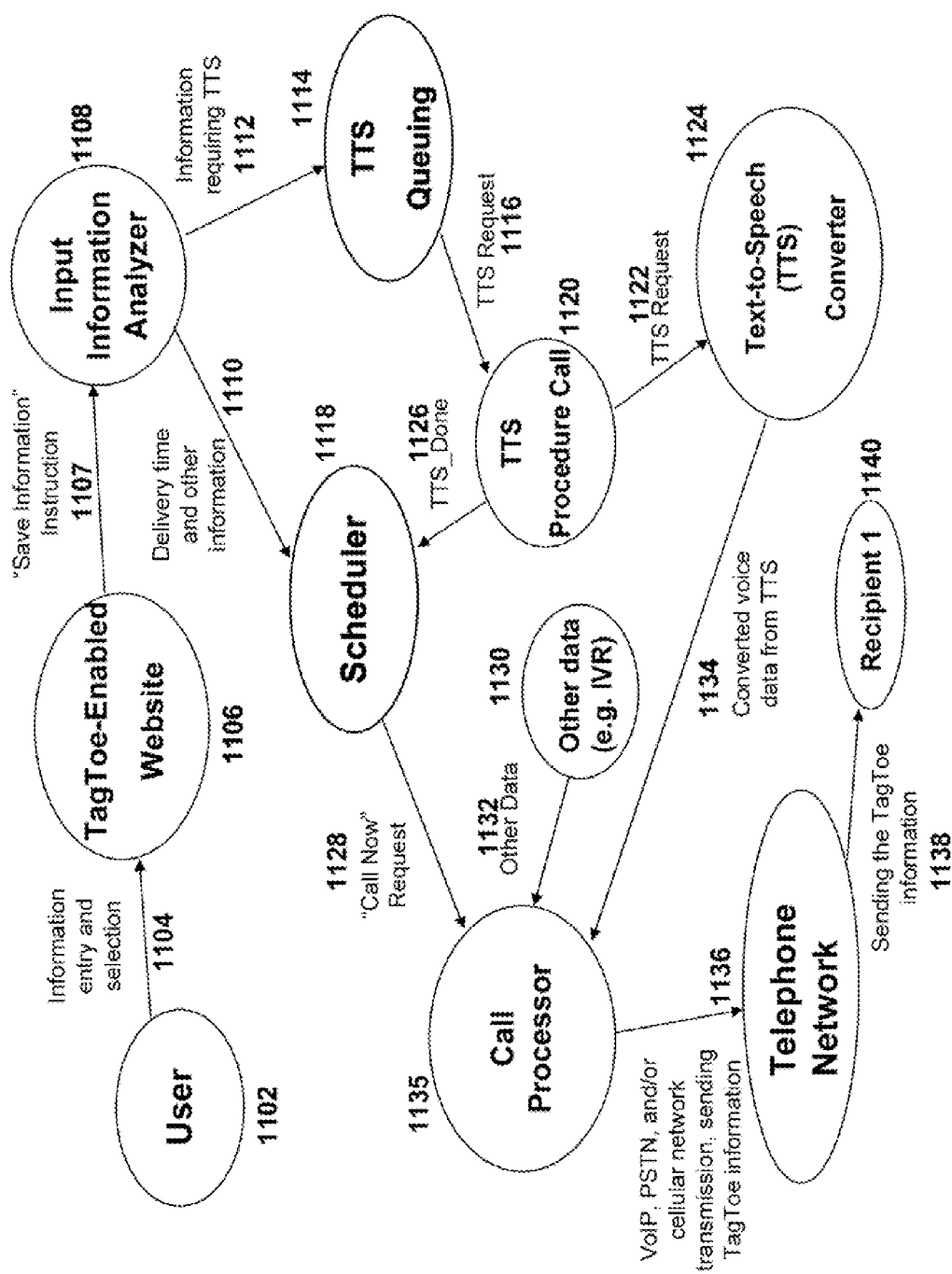
FIG. 11 shows a system configuration diagram in accordance with an embodiment of the invention.

FIG. 11 shows a system configuration diagram for a TagToe alert system in accordance with an embodiment of the invention. In this particular implementation of the invention, a user (1102) enters and/or selects information (1104) on a TagToe-enabled website (1106), typically utilizing a TagToe user interface. When the user (1102) further gives "Save Information" or an equivalent instruction to the TagToe-enabled website (1106) after making entries or selections to the TagToe user interface, an input information analyzer (1108) parses, categorizes, stores, and analyzes the input information (1104) from the user (1102). Then, the input information analyzer (1108) sends delivery time slot(s) and other relevant information (1110) to a TagToe scheduler (1118). The input information analyzer (1108) also sends categorized information (1112) requiring text-to-speech (TTS) conversion to a TTS queuing block (1114). Multiple number of instructions requiring TTS conversion can be queued into the TTS queuing block (1114).

The TTS queuing block (1114) sends a TTS request (1116) to a TTS procedure call (1120). The TTS procedure call (1120) is responsible for "pushing" a TTS request (1122) to a TTS converter (1124), which typically processes TTS requests (1122) serially. It is feasible within this embodiment of the invention that a multiple number of TTS converters is connected to the TagToe alert system for faster parallel processing of TTS conversions.

Continuing with FIG. 11, the TTS procedure call (1120) sends a "TTS_Done" signal (1126) related to a particular TTS conversion to the TagToe scheduler (1118) once the particular TTS conversion is complete. The "TTS_Done" signal (1126) informs that the TagToe scheduler (1118) is now authorized to proceed with a with a "Call Now" request (1128) at a scheduled time slot because the particular TTS conversion related to a TagToe reminder is complete. The TTS converter (1124) is configured to send converted voice data to a call processor (1135) directly. The call processor (1135) also optionally receives "other data" (1132) such as interactive voice response (IVR) data (1130) from e-commerce or customer relationship management IT infrastructures. In one embodiment of the invention, a script language provides IVR data (1132) to the call processor (1135).

The call processor (1135) is capable of gathering call scheduling information from the TagToe scheduler (1118), the TTS converter (1124), and the "other data" block (1130) to make a coherently-organized TagToe telephone call (1138) to at least one intended TagToe recipient (1140) via a telephone network (1136).

Figure 12:
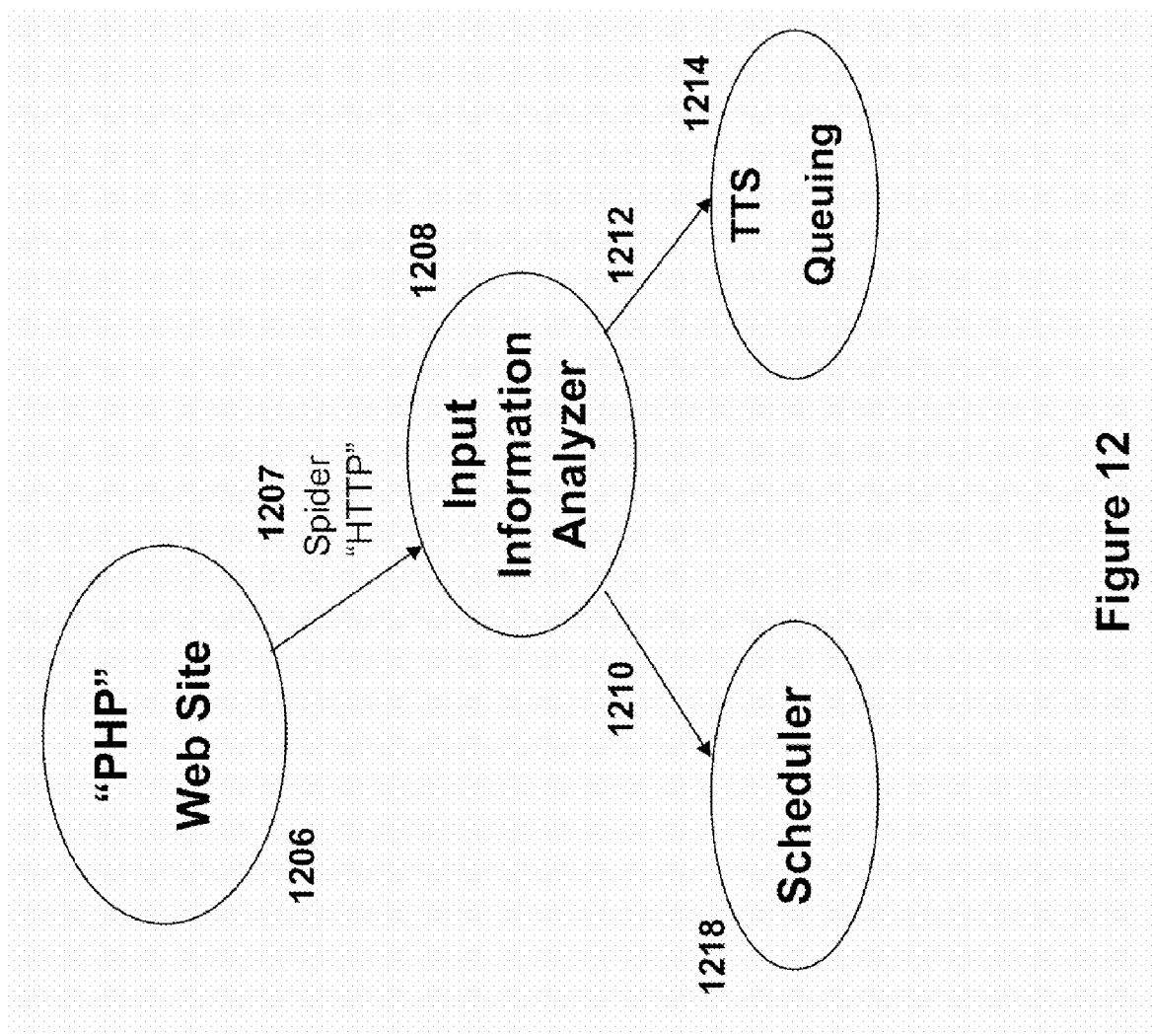
FIG. 12 shows a first subset of the system configuration diagram in accordance with an embodiment of the invention.

FIG. 12 shows an embodiment of a front-end of a TagToe alert system based on the system configuration diagram of FIG. 11. In this example, a TagToe-enabled website (1106) of FIG. 11 is a "PHP" website (1206) which transmits data to an input information analyzer (1208) by using "HTTP" spiders (1207). The input information analyzer (1208) is capable of parsing, categorizing, storing, and analyzing incoming input information to send appropriately-processed information to a TagToe scheduler (1218) and a TTS queuing block (1214). It should be noted that there are many forms of implementing the front-end of the TagToe alert system and FIG. 12 is merely one example of many possibilities and combinations.

Figure 13:
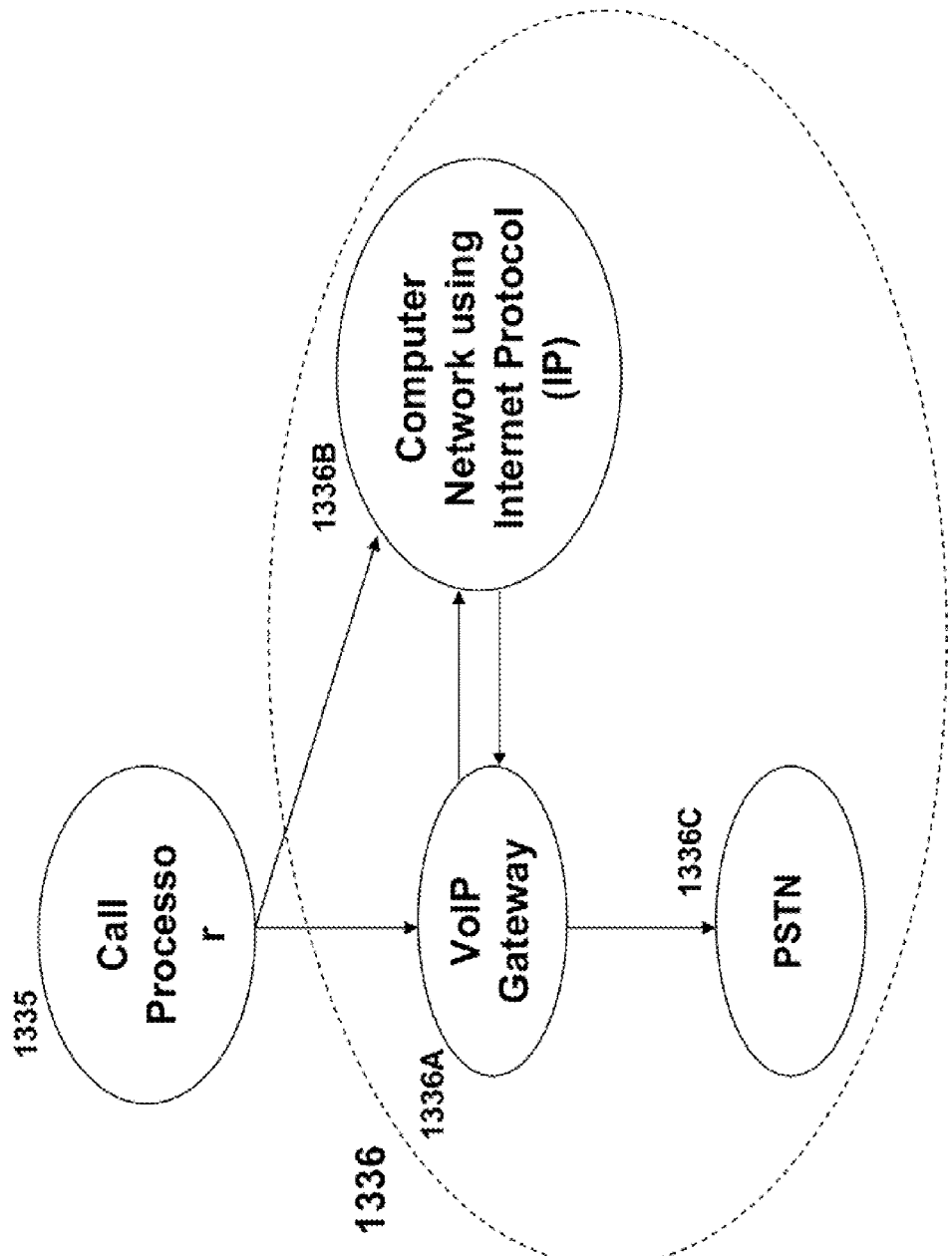
FIG. 13 shows a second subset of the system configuration diagram in accordance with an embodiment of the invention.

FIG. 13 shows an embodiment of a call processor (1335) and a telephone network (1336) based on the system configuration diagram of FIG. 11. In this example, the telephone network (1136) of FIG. 11 comprises three elements: a voice-over-IP gateway (1336A), a computer network using internet protocol (1336B), and a public-switched telephone network, or PSTN (1336C). In one embodiment of the invention, the voice-over-IP gateway (1336A) acts as an efficient interface between "packetized" IP voice data traveling on the computer network using internet protocol (1136B) and telephone voice data traveling through the public-switched telephone network (1136C). The call processor (1335) can incorporate an internet protocol (IP) or hybrid PBX to switch calls, manage routes, and connect callers with networks outside the internet protocol (IP) infrastructure. In one embodiment of the invention, the call processor (1335) is at least partly implemented with Asterisk, which is an open source telephony platform.

Figure 14:
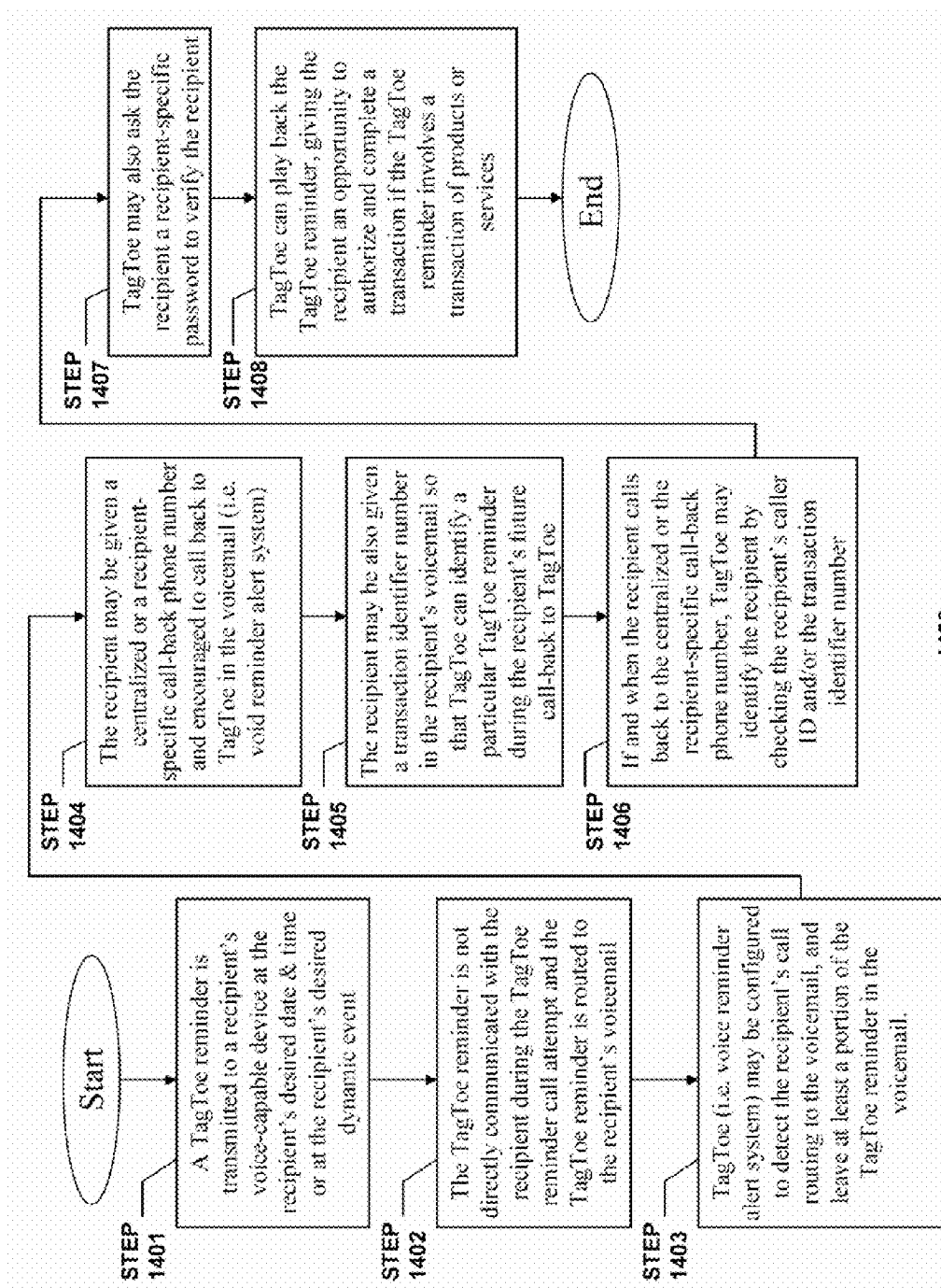
FIG. 14 shows a flowchart for a method of interaction between a TagToe reminder and a recipient's voicemail in accordance with an embodiment of the invention.

FIG. 14 shows a flowchart (1400) for a method of interaction between a TagToe reminder and a recipient's voicemail in accordance with a preferred embodiment of the invention. In STEP 1401, a TagToe reminder is transmitted to a recipient's voice-capable device at the recipient's desired date and time or at the recipient's desired dynamic event. In STEP 1402, the TagToe reminder is not directly communicated with the recipient during the TagToe reminder call attempt and the TagToe reminder is routed to the recipient's voicemail.

In STEP 1403, a TagToe system (i.e. voice reminder alert system) may be configured to detect a routing to the recipient's voicemail and leave at least a portion of the TagToe reminder in the voicemail. In STEP 1404, the recipient may be given a centralized or a recipient-specific call-back phone number to the TagToe system. In one embodiment of the invention, the TagToe system leaves the TagToe reminder in the voicemail with a Caller-ID which may be the centralized or the recipient-specific call-back phone number to the TagToe system. In one preferred embodiment of the invention, the TagToe reminder recorded in the recipient's voicemail encourages the recipient to call back to the TagToe system.

Continuing with FIG. 14, the recipient may be also given a transaction identifier number in the recipient's voicemail so that TagToe system can retrieve and/or identify a particular TagToe reminder during the recipient's future call-back to the TagToe system, as shown in STEP 1405. Then, if and when the recipient calls back to the centralized or the recipient-specific call-back phone number, the TagToe system may identify the recipient by checking the recipient's caller ID and/or the transaction identification number as shown in STEP 1406. In addition, the TagToe system may also ask the recipient a recipient-specific password to authenticate and verify the recipient, as shown in STEP 1407. Then, the TagToe system can play back the TagToe reminder, which may provide the recipient an opportunity to authorize and complete a transaction if the TagToe reminder involves a transaction of a product or a service, as shown in STEP 1408.

A preferred method and a preferred apparatus to improve transaction success rates for voice reminder applications in e-commerce, as shown in FIG. 14 may play an important role in achieving higher sales revenues for online stores, auction sites, and online service providers, because a purchase reminder phone call which utilizes a text-to-speech alert system (i.e. TagToe) may reach a recipient's (e.g. a consumer's) telephone voicemail instead of the recipient himself/herself at the time of call deliveries. By incorporating an intuitive user interaction method as shown in FIG. 14 to make a recipient's callback to the text-to-speech alert system easy and simple, an e-commerce provider utilizing the purchase reminder phone call can achieve higher transaction success rates.

Figure 15:
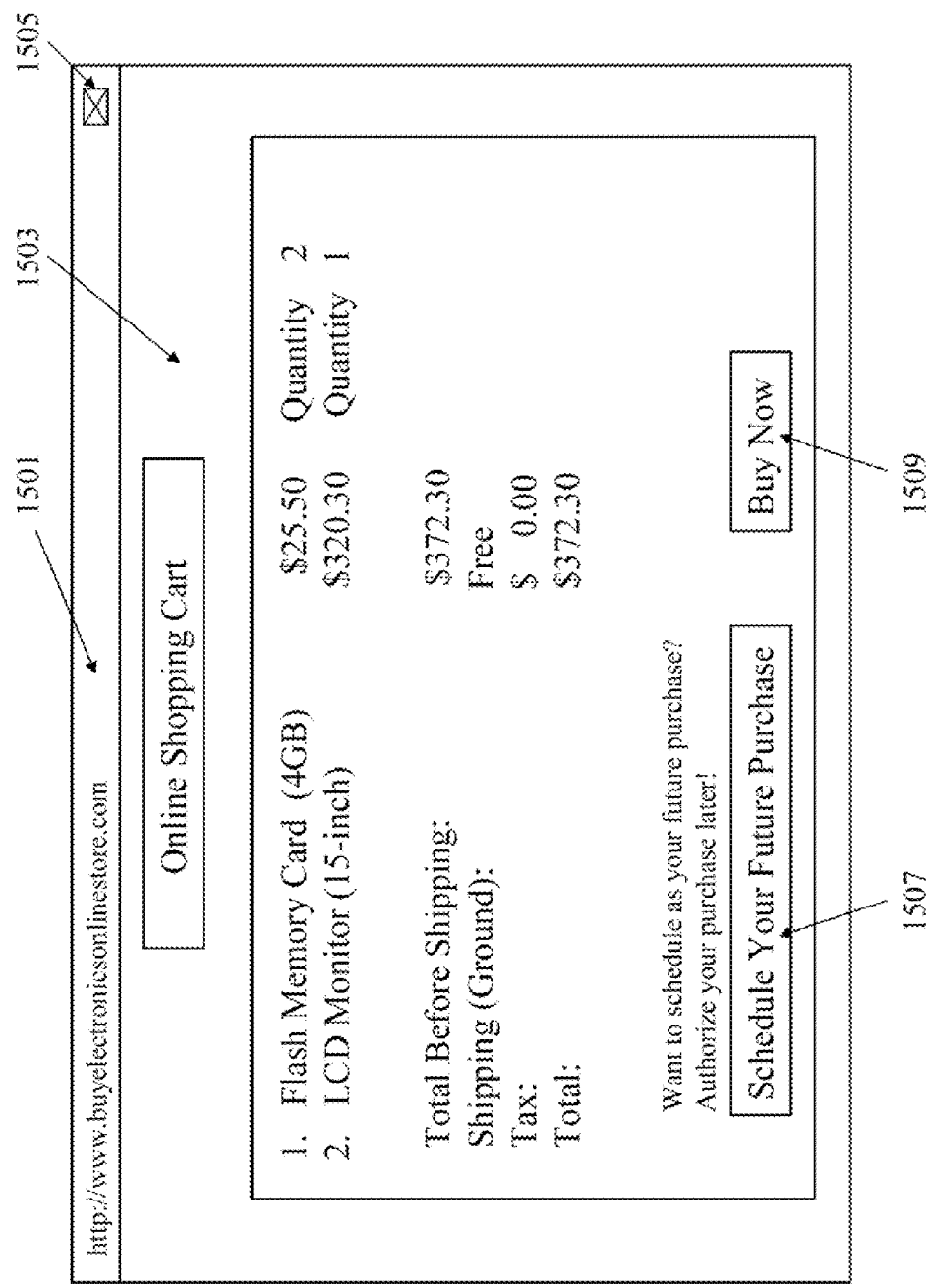
FIG. 15 shows a first screenshot for a shopping-cart abandonment reduction method in accordance with an embodiment of the invention.

FIG. 15 shows a first screenshot for a shopping-cart abandonment reduction method in accordance with an embodiment of the invention. This shopping-cart abandonment reduction method is also likely to improve transaction success rates in e-commerce utilizing TagToe. In one preferred embodiment of the invention, the first screenshot displays a web browser (1500) comprising a web domain address bar (1501), an e-commerce storefront area (1503) displayed by a currently-accessed web address, a browser-close button (1505), a TagToe-scheduling button (e.g. "Schedule Your Future Purchase" button (1507)), and a complete transaction-now button (e.g. "Buy Now" button (1509)). In the first screenshot as shown in FIG. 15, the e-commerce storefront area (1503) displays two Flash Memory Cards (4 GB) and an 15-inch LCD monitor as shopping-carted items. The e-commerce storefront area (1503) also displays a total amount (e.g. $372.30) before shipping, shipping costs (e.g. free), a tax amount (e.g. $0.00), and a total transaction amount (e.g. $372.30).

In one preferred embodiment of the invention, the TagToe-scheduling button (e.g. "Schedule Your Future Purchase" button (1507)) triggers a unique and novel TagToe user interface which allows a consumer to schedule a TagToe purchase reminder. In a preferred embodiment of the invention, when and if the TagToe purchase reminder is delivered to the consumer at a scheduled date and time or at an occurrence of a specified dynamic event, the consumer can complete a desired transaction of one or more items during the TagToe purchase reminder call. In another embodiment of the invention, the TagToe purchase reminder is linked to an online calendar and the consumer uses a TagToe purchase reminder-related hyperlink in the online calendar to complete the transaction of one or more items. FIG. 15 also shows the complete transaction-now button (e.g. "Buy Now" button (1509)) which enables an immediate purchase of one or more items. The complete transaction-now button is conventional to most e-commerce providers today.

Figure 16:
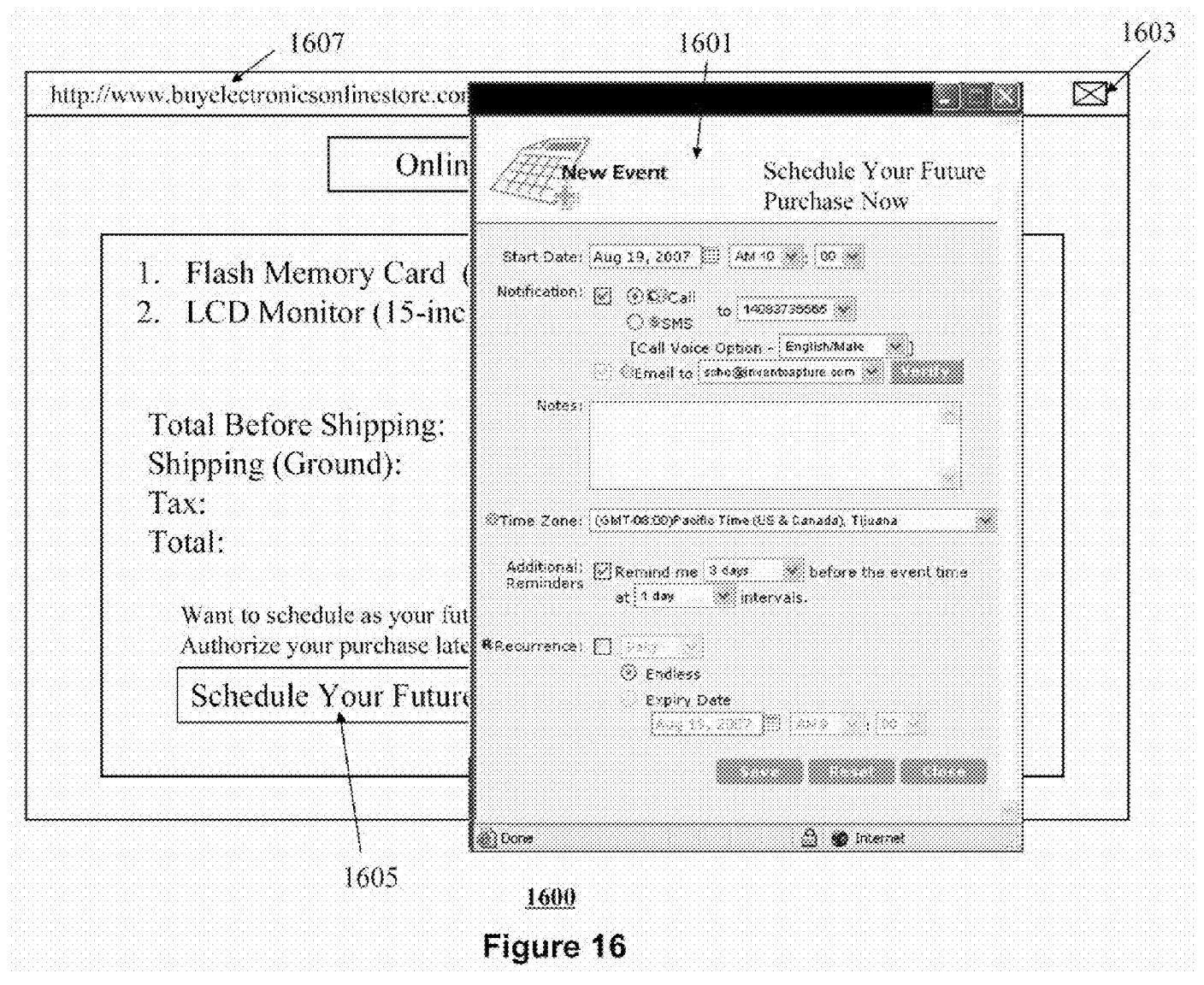

FIG. 16 shows a second screenshot for a shopping-cart abandonment reduction method in accordance with an embodiment of the invention. In one preferred embodiment of the invention, the second screenshot displays a web browser (1600) comprising a web domain address bar (1607), an e-commerce storefront area, a browser-close button (1603), and a TagToe-scheduling button (e.g. "Schedule Your Future Purchase" button (1605)) after the TagToe-scheduling button (1605 of FIG. 16 or 1507 of FIG. 15) is triggered. In one preferred embodiment of the invention, triggering the TagToe-scheduling button (1605 of FIG. 16 or 1507 of FIG. 15) brings a TagToe reminder-scheduling user interface (1601) to a consumer's computer screen. In one preferred embodiment of the invention, the consumer can enter one or more recipients' phone numbers for a TagToe reminder delivery by using the TagToe reminder-scheduling user interface (1601). The consumer can also enter a specific date and time or a dynamic event for triggering a TagToe reminder delivery by using the TagToe reminder-scheduling user interface (1601). Typically, the one or more recipients' phone numbers include the consumer's own phone number.

Figure 17:
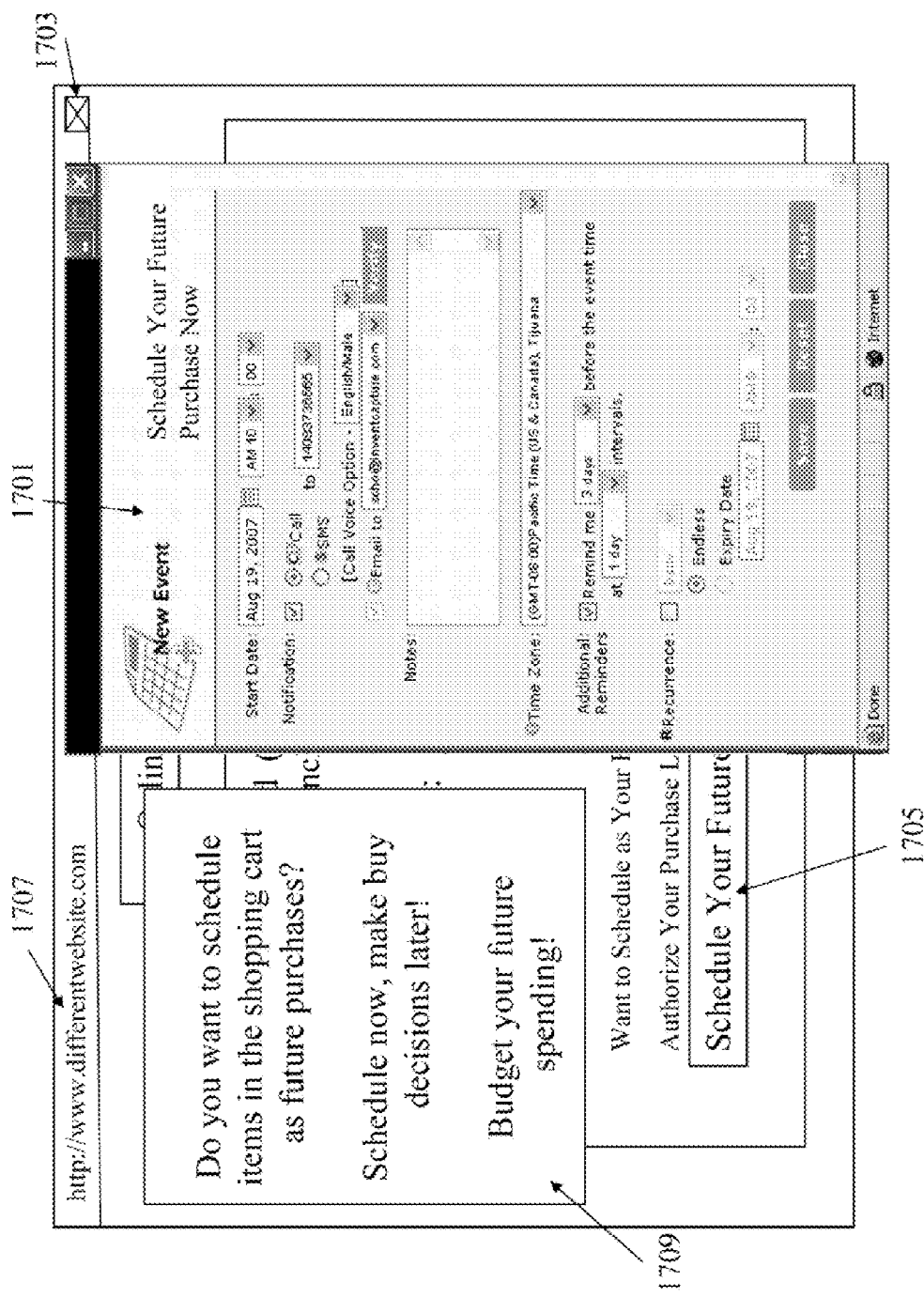
FIG. 17 shows a third screenshot for a shopping-cart abandonment reduction method in accordance with an embodiment of the invention.

FIG. 17 shows a third screenshot for a shopping-cart abandonment reduction method in accordance with an embodiment of the invention. In one preferred embodiment of the invention, the third screenshot displays a web browser (1700) comprising a web domain address bar (1707), an e-commerce storefront area, a browser-close button (1703), and a TagToe-scheduling button (e.g. "Schedule Your Future Purchase" button (1705)). In one preferred embodiment of the invention, if a consumer attempts to type in a new web domain address in the web domain address bar (1707) or attempts to close the web browser (e.g. by triggering the browser-close button (1703)) after placing one or more items in a shopping cart of a currently-accessed e-commerce website but before completing a purchase of the one or more items in the shopping cart, then the currently-accessed e-commerce web site is configured to prevent the consumer from leaving the currently-accessed e-commerce website at least once and generate a persuading message (e.g. 1709) and/or a TagToe reminder-scheduling user interface (1701) to a consumer's computer screen. In one preferred embodiment of the invention, generation of the persuading message (e.g. 1709) and/or the TagToe reminder-scheduling user interface (1701) when the consumer makes a first attempt to abandon the shopping cart effectively reduces shopping cart abandonment rates of the currently-accessed e-commerce website by encouraging the consumer to use a TagToe purchase reminder to authorize, authenticate, and/or complete the purchase transaction at a consumer-specified future date and time.

Continuing with FIG. 17, in one preferred embodiment of the invention, the consumer can enter one or more recipients' phone numbers for a TagToe reminder delivery by using the TagToe reminder-scheduling user interface (1701). The consumer can also enter a specific date and time or a dynamic event for triggering a TagToe reminder delivery by using the TagToe reminder-scheduling user interface (1701). Typically, the one or more recipients' phone numbers include the consumer's own phone number.

Figure 18:
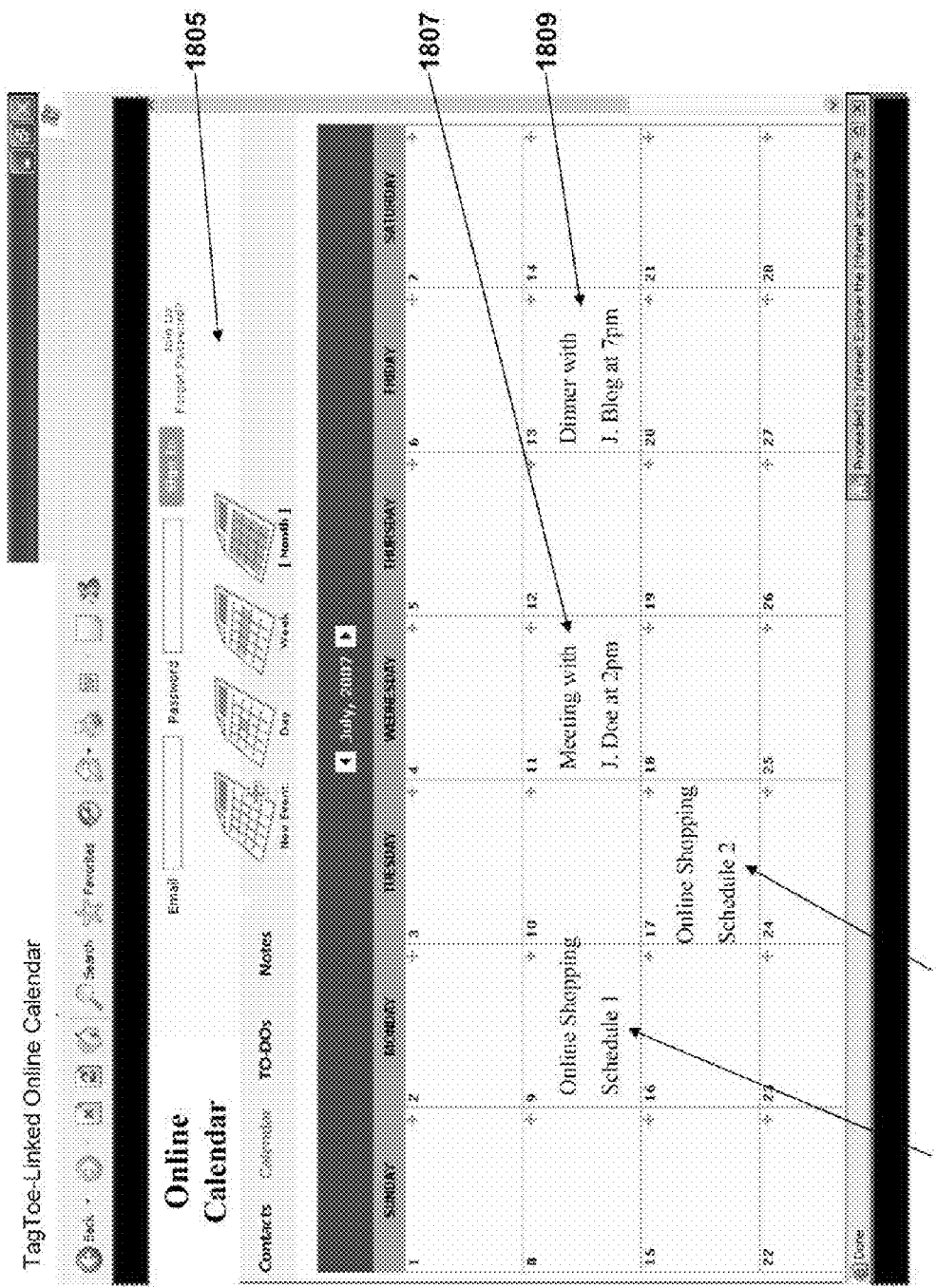
FIG. 18 shows a screenshot exhibiting a synergy between a TagToe-linked calendar and a TagToe reminder system in accordance with an embodiment of the invention.

FIG. 18 shows a screenshot (1800) exhibiting a synergy between a TagToe-linked online calendar (1805) and a TagToe reminder system in accordance with an embodiment of the invention. In one preferred embodiment of the invention, one or more online calendar entries (e.g. 1801 and 1803) are purchase reminders, typically containing one or more hyperlinks to an e-commerce storefront. The purchase reminders are also related and linked to TagToe purchase reminders (i.e. purchase reminder voice calls). For example, if a consumer does not purchase a consumer-desired item through a hyperlink in an online calendar entry containing a purchase reminder prior to a date and time correlated to the online calendar entry, then a TagToe purchase reminder is typically delivered to a consumer's specified voice-capable electronic device as a voice reminder call at the date and time correlated to the online calendar entry. On the other hand, if the consumer purchases the consumer-desired item through the hyperlink in the online calendar entry containing the purchase reminder prior to the date and time correlated to the online calendar entry, then the TagToe purchase reminder as the voice reminder call may be cancelled automatically after a purchase transaction for the consumer-desired item is completed through the hyperlink in the online calendar entry.

Continuing with FIG. 18, the TagToe-linked online calendar (1805) is also configured to be used as a regular calendar containing conventional calendar entries such as meeting appointments (e.g. 1807) and lunch/dinner appointments (e.g. 1809), which are typically correlated to desired dates and time. By incorporating TagToe purchase reminders as online calendar entries, the present invention enables a consumer to schedule, anticipate, budget, and transact future shopping items using a TagToe-linked online calendar. Furthermore, by linking TagToe purchase reminders from a TagToe reminder provider to an online calendar provider and an e-commerce provider, the present invention creates a novel and synergistic profit model (e.g. sales and/or transaction commission-based, pay-per-click, and etc.) for the TagToe reminder provider and the online calendar provider while enabling a higher potential sales to actual sales conversion ratio for the e-commerce provider.

Figure 19:
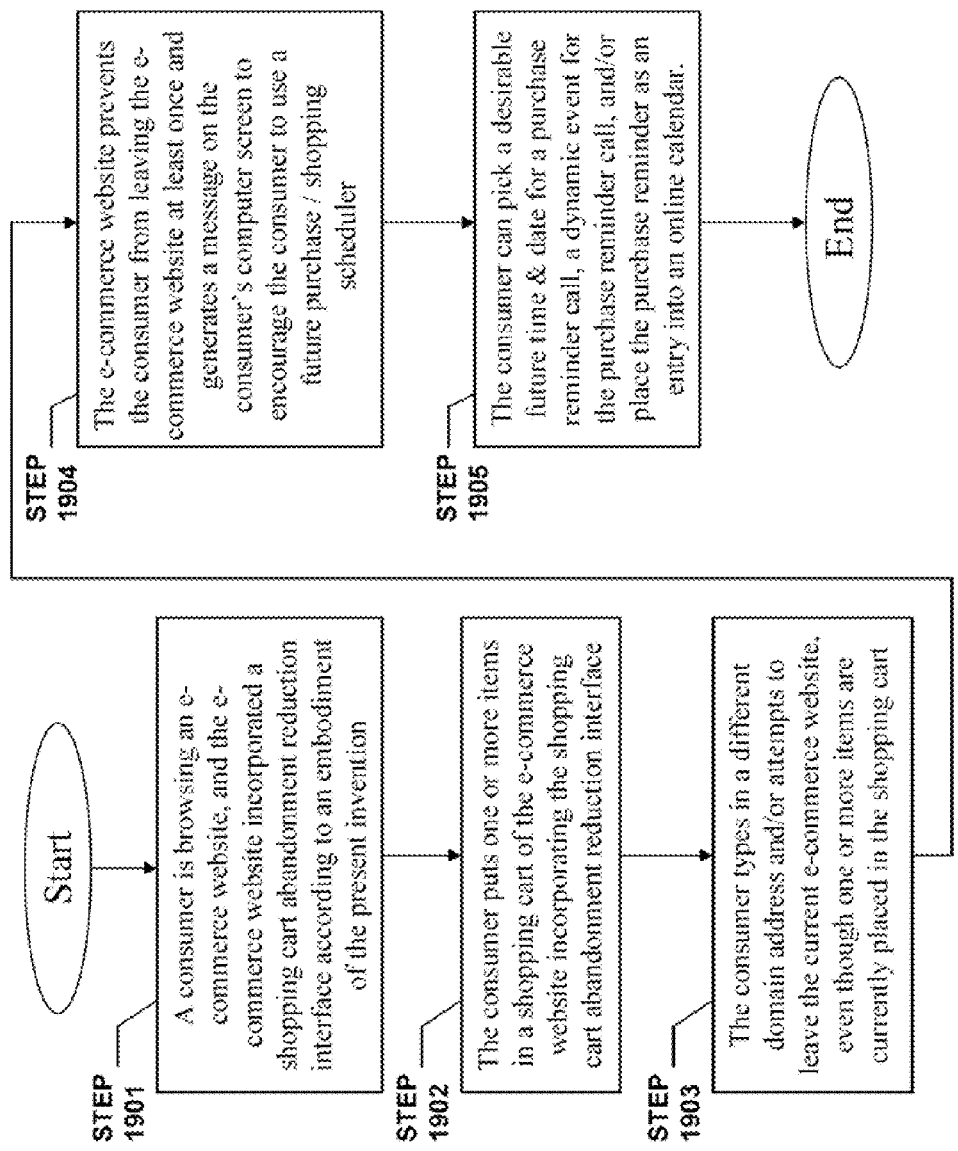
FIG. 19 shows a flowchart for a shopping-cart abandonment reduction method in accordance with an embodiment of the invention.

FIG. 19 shows a flowchart (1900) for a shopping-cart abandonment reduction method in accordance with a preferred embodiment of the invention. This shopping-cart abandonment reduction method is also likely to improve transaction success rates in e-commerce. In one preferred embodiment of the invention, a consumer begins to browse an e-commerce website which incorporated a shopping cart abandonment reduction interface linked to a TagToe system, as shown in STEP 1901. Then, the consumer puts one or more items in a shopping cart of the e-commerce website, as shown in STEP 1902. The consumer then types in a different domain address in a web browser and/or attempts to leave the current e-commerce website, even though the consumer did not complete purchase transaction of the one or more items in the shopping cart, as shown in STEP 1903. Utilizing the shopping cart abandonment reduction interface linked to the TagToe system, the e-commerce website prevents the consumer from leaving the e-commerce website at least once and generates a message on the consumer's computer screen to encourage the consumer to use a purchase reminder scheduler, as shown in STEP 1904. If the consumer decides to schedule the purchase reminder for the one or more items in the shopping cart, then the consumer can select a desirable future time and date for a TagToe purchase reminder call, a dynamic event to trigger the TagToe purchase reminder call, and/or a related purchase reminder entry into a TagToe-linked online calendar, as shown in STEP 1905.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for communicating a text-to-speech (TTS) reminder phone call to a recipient's voicemail for improvement of transaction success rates, the method comprising:

transmitting the text-to-speech (TTS) reminder phone call to a recipient's voice-capable device at a recipient's desired date and time or at a recipient's desired dynamic event;

delivering the text-to-speech (TTS) reminder phone call to the recipient's voicemail because the recipient's voice-capable device routes the text-to-speech (TTS) reminder phone call to the recipient's voicemail, wherein a text-to-speech (TTS) alert system delivering the text-to-speech (TTS) reminder phone call is configured to detect a routing scheme to the recipient's voicemail to record at least a portion of a message from the text-to-speech (TTS) reminder phone call, a centralized or a recipient-specific call-back phone number, and/or a transaction identifier number in the recipient's voicemail;

identifying a recipient using the recipient-specific call-back phone number and/or the transaction identifier if the recipient calls back to the text-to-speech (TTS) alert system; and re-transmitting and replaying the text-to-speech (TTS) reminder phone call when the recipient calls back to the text-to-speech (TTS) alert system, wherein the recipient is given an opportunity to authorize, authenticate, and/or complete a transaction if the text-to-speech (TTS) reminder phone call involves a transaction of products or services.

2. The method of claim 1, wherein the text-to-speech (TTS) reminder phone call is a TagToe reminder and the text-to-speech alert system is a TagToe system.

3. The method of claim 1, wherein the text-to-speech (TTS) reminder phone call is a purchase reminder call and integrates an interactive voice response (IVR) interface to enable the recipient to authorize, authenticate, and/or complete the transaction of products or services during the purchase reminder call to the recipient.

4. The method of claim 1, wherein the text-to-speech (TTS) reminder phone call includes at least some product-related and price-related information for a product or a service associated with an e-commerce provider.

5. The method of claim 1, wherein the text-to-speech (TTS) reminder phone call includes an option for the recipient to either delay or cancel the transaction of products or services.

* * * * *